(12) United States Patent
Uzaki et al.

(10) Patent No.: US 11,171,901 B2
(45) Date of Patent: Nov. 9, 2021

(54) CHAT SERVER, CHAT SYSTEM, AND NON-TRANSITORY COMPUTER READABLE STORAGE MEDIUM FOR SUPPLYING IMAGES AND CHAT DATA

(71) Applicant: JVCKENWOOD Corporation, Yokohama (JP)

(72) Inventors: Jiro Uzaki, Yokohama (JP); Naoyuki Okada, Yokohama (JP); Mizuki Ohara, Yokohama (JP); Shun Tanaka, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 16/850,039

(22) Filed: Apr. 16, 2020

(65) Prior Publication Data
US 2020/0336448 A1    Oct. 22, 2020

(30) Foreign Application Priority Data

Apr. 17, 2019 (JP) .............. JP2019-078238
Apr. 17, 2019 (JP) .............. JP2019-078239
Apr. 17, 2019 (JP) .............. JP2019-078335
Apr. 17, 2019 (JP) .............. JP2019-078811
Apr. 17, 2019 (JP) .............. JP2019-078812

(51) Int. Cl.
G06F 15/16    (2006.01)
H04L 12/58    (2006.01)
H04W 4/12    (2009.01)

(52) U.S. Cl.
CPC ............ *H04L 51/10* (2013.01); *H04L 51/046* (2013.01); *H04W 4/12* (2013.01)

(58) Field of Classification Search
CPC ......... H04L 51/10; H04L 51/046; H04W 4/12
USPC ............... 709/204, 206, 203, 207, 217, 226
See application file for complete search history.

(56) References Cited

U.S. PATENT DOCUMENTS

| | | | |
|---|---|---|---|
| 8,595,763 B1 * | 11/2013 | Packard | H04N 21/2668 725/34 |
| 2007/0196806 A1 * | 8/2007 | Ljungman | G09B 3/00 434/350 |
| 2016/0337710 A1 * | 11/2016 | Badaan | H04N 21/2668 |
| 2018/0301169 A1 * | 10/2018 | Ricciardi | G06F 16/784 |
| 2019/0192979 A1 * | 6/2019 | Eatedali | A63F 13/795 |

FOREIGN PATENT DOCUMENTS

JP    2011-091754    5/2011

* cited by examiner

*Primary Examiner* — Kaylee J Huang
(74) *Attorney, Agent, or Firm* — Amin, Turocy & Watson, LLP

(57) ABSTRACT

A chat server includes an image data selection unit selecting, when one piece of chat data generated with a chat data processor is designated in a chat terminal device, one piece of image data from pieces of image data stored in a storage unit on the basis of evaluation points set for tag ranges corresponding to the designated chat data, and transmitting the selected image data from a server side communication unit to the chat terminal device.

15 Claims, 15 Drawing Sheets

FIG.3

| INPUT ID | INPUTTER ID | INPUT CONTENTS | TAG INFORMATION |
|---|---|---|---|
| C054 | 999 | BOTTOM OF 8TH INNING, BATTER 007, HIT TO CENTER | TC0054 |
| C055 | 052 | ○○○ | TC0055 |
| C056 | 017 | △△△ | TC0056 |
| C057 | 038 | × × × | TC0057 |
| C058 | 999 | BOTTOM OF 8TH INNING, BATTER 008, STRIKEOUT | TC0058 |
| C059 | 052 | □□□ | TC0059 |
| C060 | 038 | ○△○ | TC0060 |
| C061 | 017 | △□× | TC0061 |
|  |  |  |  |

FIG.4

| TAG INFORMATION | PROCESSING TIME INFORMATION |
|---|---|
| TC0054 | 10:03:05 |
| TC0055 | 10:03:10 |
| TC0056 | 10:03:14 |
| TC0057 | 10:06:37 |
| TC0058 | 10:08:12 |
| TC0059 | 10:08:17 |
| TC0060 | 10:09:20 |
| TC0061 | 10:09:25 |
| ⋮ | ⋮ |

FIG.9
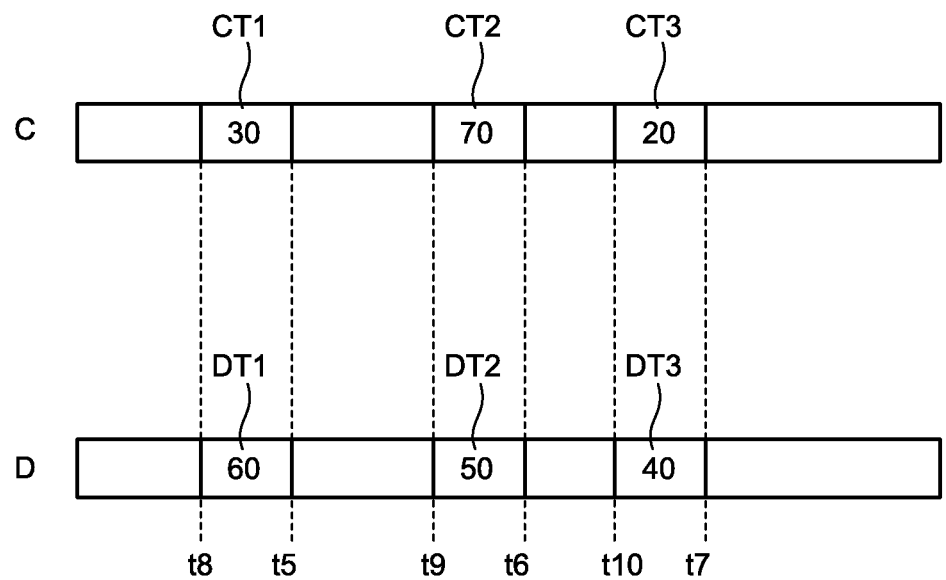
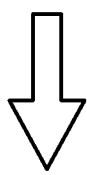
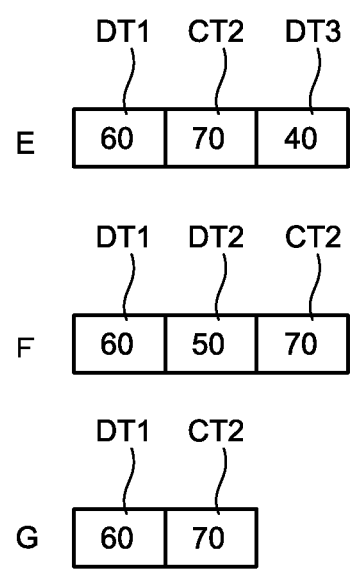

FIG.13
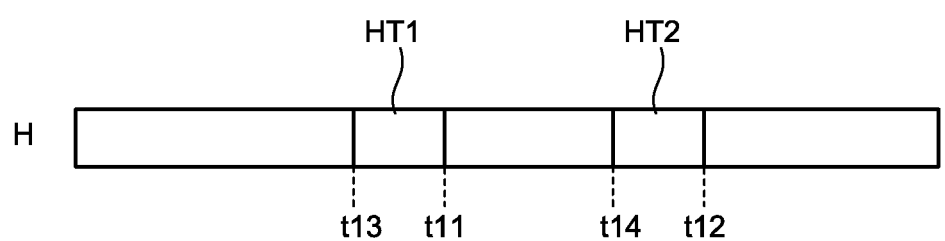
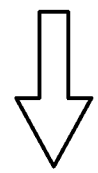
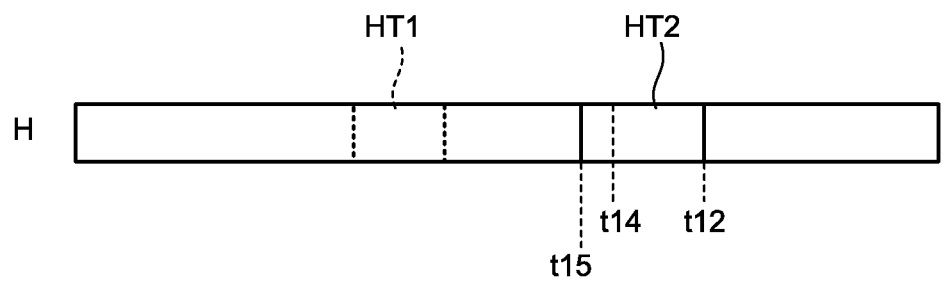

FIG.15
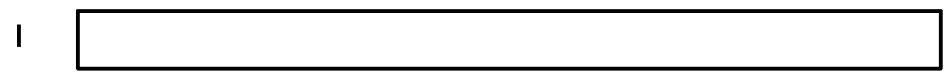
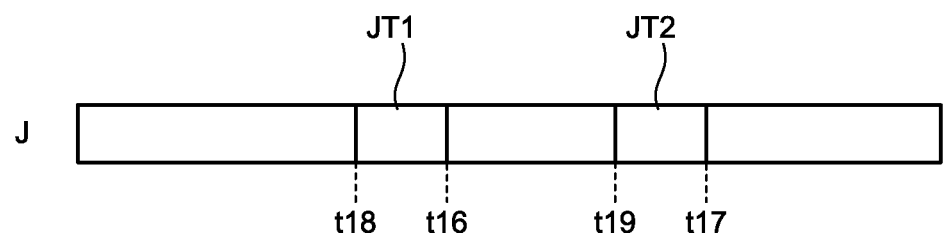
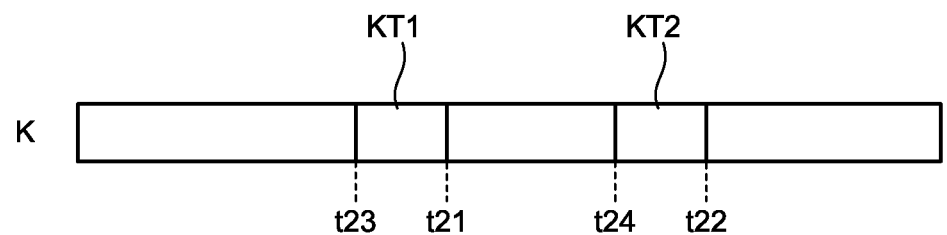
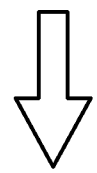
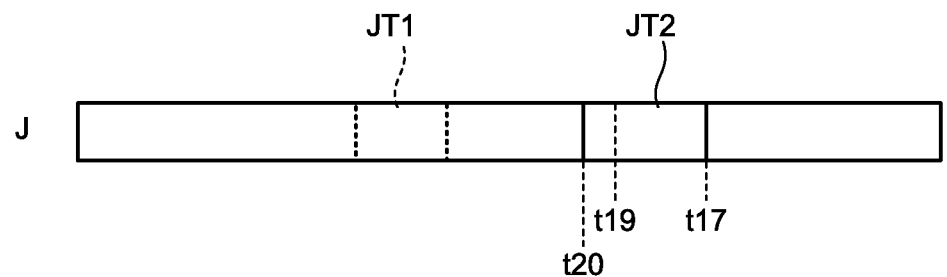
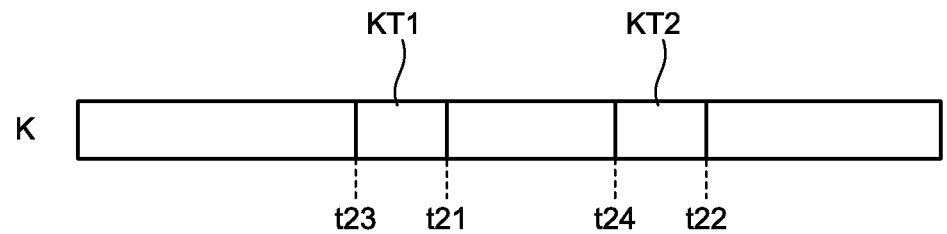

CHAT SERVER, CHAT SYSTEM, AND NON-TRANSITORY COMPUTER READABLE STORAGE MEDIUM FOR SUPPLYING IMAGES AND CHAT DATA

CROSS-REFERENCE TO RELATED APPLICATIONS

This application claims priority from Japanese Applications No. 2019-078335, No. 2019-078811. No. 2019-078812, No. 2019-078238 and No. 2019-078239, filed on Apr. 17, 2019, the contents of which are incorporated by reference herein in its entirety.

BACKGROUND

1. Technical Field

The present disclosure relates to a chat server, a chat system, a chat display method, and an image data processing program.

2. Description of the Related Art

When a game or match of sports competition is held, the state of the game is reported using a chat or the like and/or images taken by cameras are distributed such that even a person who cannot participate in or directly watch the game can grasp the state of the game. By contrast, when the person checks the chat and/or the distributed images using a smartphone or the like, the person needs to switch the screens when checking the chat and when checking the images, making it difficult for the person to simultaneously check the chat and the images. By contrast, for example, Japanese Laid-open Patent Publication No. 2011-91754 discloses recording program images and chat in association in terms of time, and outputting the related chat simultaneously as the program is played back.

The technique disclosed in Japanese Laid-open Patent Publication No. 2011-91754 A enables simultaneous checking of the images and the chat in real time, but is insufficient in executing an operation using temporal association between the images and the chat, and it is desired to supply images more suitable for the user's request.

SUMMARY

It is an object of the present disclosure to at least partially solve the problems in the conventional technology.

A chat server according to the present disclosure includes: an image data acquisition unit that acquires a plurality of pieces of image data acquired by shooting a game with a plurality of shooting devices; a game state data acquisition unit that acquires game state data of the game; a chat data processor that generates chat data of contents corresponding to the game state data when the game state data is acquired; a tag information setting unit that sets tag ranges each serving as a range of time corresponding to input time at which the game state data is input and evaluation points for the respective tag ranges, for each of the acquired pieces of image data, as tag information; a storage unit storing therein the chat data and the pieces of image data for each of which the tag information is set; a server side communication unit that is capable of transmitting the chat data and the image data stored in the storage unit to a chat terminal device; and an image data selection unit that selects, when one piece of the chat data generated with the chat data processor is designated in the chat terminal device, one of the pieces of image data from the pieces of image data stored in the storage unit in response to the evaluation points set for the tag ranges corresponding to the designated chat data, and transmits the selected image data from the server side communication unit to the chat terminal device.

A chat system according to the present disclosure includes: a server; and a chat terminal, the server including: an image data acquisition unit that acquires a plurality of pieces of image data acquired by shooting a game with a plurality of shooting devices; a game state data acquisition unit that acquires game state data of the game; a chat data processor that generates chat data of contents corresponding to the game state data when the game state data is acquired; a tag information setting unit that sets tag ranges each serving as a range of time corresponding to input time at which the game state data is input and evaluation points for the respective tag ranges, for each of the acquired pieces of image data, as tag information; a storage unit storing therein the chat data and the pieces of image data for each of which the tag information is set; a server side communication unit that is capable of transmitting the chat data and the image data stored in the storage unit to a chat terminal device; and an image data selection unit that selects, when one piece of the chat data generated with the chat data processor is designated in the chat terminal device, one of the pieces of image data from the pieces of image data stored in the storage unit in response to the evaluation points set for the tag ranges corresponding to the designated chat data, and transmits the selected image data from the server side communication unit to the chat terminal device, the chat terminal including: a communication unit that acquires the chat data and the image data from the server; and a controller that displays the acquired image data and the acquired chat data in different regions in a display unit and, when one piece of the chat data generated with the chat data processor and displayed on the display unit is designated with an input unit, transmits a message indicating that the chat data is designated to the server, receives the image data selected with the image data selection unit from the server, and displays the image data on the display unit.

A non-transitory computer readable storage medium storing therein an image data processing program according to the present disclosure causes a server to execute: processing of acquiring a plurality of pieces of image data acquired by shooting a game with a plurality of shooting devices; processing of acquiring game state data of the game; processing of generating chat data of contents corresponding to the game state data when the game state data is acquired; processing of setting tag ranges each serving as a range of time corresponding to input time at which the game state data is input and evaluation points for the respective tag ranges, for each of the acquired pieces of image data, as tag information; processing of storing the chat data and the pieces of image data for each of which the tag information is set; processing of transmitting the chat data and the selected image data to a chat terminal device; and processing of selecting, when one piece of the chat data generated in accordance with the game state data is designated in the chat terminal device, one of the pieces of image data from the stored pieces of image data in response to the evaluation points set for the tag ranges corresponding to the designated chat data, and transmitting the selected image data from a server side communication unit to the chat terminal device.

The above and other objects, features, advantages and technical and industrial significance of this disclosure will be better understood by reading the following detailed

BRIEF DESCRIPTION OF THE DRAWINGS

FIG. 3 is a diagram illustrating an example of chat data stored in a storage unit;

FIG. 4 is a diagram illustrating an example of synchronous data stored in the storage unit;

FIG. 9 is a diagram schematically illustrating an example of digest data;

FIG. 13 is a diagram schematically illustrating an example of tag information;

FIG. 15 is a diagram schematically illustrating an example of tag information.

DETAILED DESCRIPTION

Embodiments of the present disclosure will be described hereinafter with reference to drawings. The present disclosure is not limited to the embodiments. Constituent elements in the following embodiments include elements that can be replaced by a person skilled in the art, obvious elements, or substantially the same elements.

First Embodiment

Figure 1:
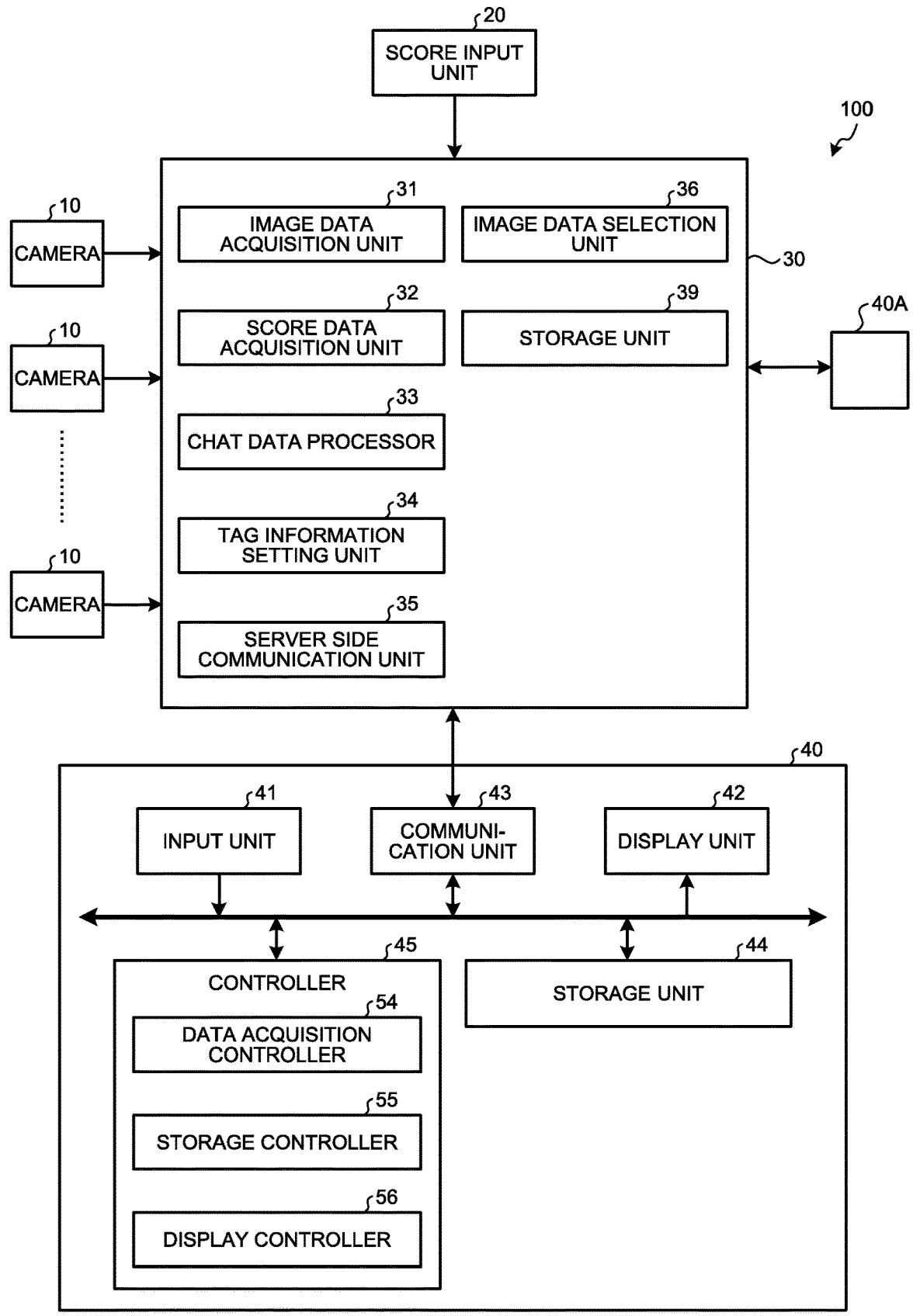
FIG. 1 is a block diagram illustrating an example of a chat system according to a first embodiment.

FIG. 1 is a block diagram illustrating an example of a chat system 100 according to a first embodiment. The chat system 100 illustrated in FIG. 1 is used in the case of performing a chat about details of a game, for example, in a sports competition such as baseball. Using the chat system 100 enables the state of the game and the like to be reported using a chat so that even a person who cannot participate in or directly watch the game can grasp the state of the game, for example. In the following explanation, baseball is mentioned as an example of the sports competition, but the structure is not limited thereto. The same explanation is possible in other sports competitions, such as soccer, volleyball, tennis, and badminton. As another example, the chat system 100 is also applicable to contests or competitions other than sports, such as a dance contest (dance competition), a piano contest (playing competition), a karuta tournament (card game competition or table game competition), and a karaoke contest (singing competition).

As illustrated in FIG. 1, the chat system 100 includes cameras 10, a score input unit 20, a server 30, and chat terminal devices 40 and 40A. The cameras 10 shoot the details of the game in, for example, the site of the game. Image data shot with the cameras 10 is transmitted to, for example, the server 30, and managed in the server 30. For example, a plurality of cameras 10 are set. In addition, the cameras 10 may be any cameras as long as they can shoot image data. For example, the cameras 10 may be cameras or the like attached to mobile phones, smartphones, or the like. When the cameras 10 shoot image data, the cameras 10 include data indicating the shooting time in the image data.

The score input unit 20 inputs game state data indicating the state of the game to the server 30. In the present embodiment, for example, score data is mentioned as the game state data indicating the state of the game of baseball. Score data is data forming the score recorded on the scorebook of baseball, and individual events forming a series of events starting from a pitch of the pitcher. The score is a set of score data. Accordingly, a plurality of pieces of score data is prepared every time the pitcher pitches a ball, and thereby a score is prepared. For example, when the result of batting in the state where a runner is on first base is out on a fly to right and the runner on first base is tagged out, score data indicating that the batter has been put out, score data indicating a fly to right, and score data indicating that the runner on first base has been tagged out are prepared, and a score is formed of these pieces of score data.

The score may include score data, such as action of the batter, action of the fielders, settlement of the count, advance of a runner when any runner is on base, and other actions of the batter and/or fielders, as well as the score data explained above as an example. Specifically, the score may include score data, such as a strike, a ball, a foul, the result of batting, the type of the batted ball, the fielder who caught the ball, and the result of advance of the runner. The result of batting is information, such as out, a one-base hit, a two-base hit, a three-base hit, and a home run. The type of the batted ball is information, such as a grounder, a liner, a fly, and a bunt, and may be classified further minutely. The fielder who caught the ball is information to specify the fielder who actually caught the ball or the fielding position of the fielder. The result of advance of the runner is information on advance of the runner on base, such as "from first base to second base", and may also include other actions of the batter and/or the fielder or the like.

Examples of the score input unit 20 include an application inputting the score data as electronic data to the server 30. In this case, the score input unit 20 may be provided on a processing device, such as a personal computer set outside the server 30. As another example, the score input unit 20 may be provided on the server 30. In the present embodiment, no score input unit 20 may be provided.

The server 30 manages the chat system 100 in an integrated manner. The server 30 includes various types of applications, data, and/or computer programs to manage the chat system 100. For example, a personal computer or a workstation or the like is used as the server 30, but the structure is not limited thereto.

A plurality of chat groups are set in the server 30. The chat groups are individually set, for example, for respective competitions, respective games, or respective teams. The server 30 performs various types of processing explained hereinafter for each of the chat groups.

The server 30 includes an image data acquisition unit 31, a score data acquisition unit (game state data acquisition unit) 32, a chat data processor 33, a tag information setting unit 34, a server side communication unit 35, an image data selection unit 36, and a storage unit 39.

The image data acquisition unit 31 acquires image data shot by the cameras 10. The image data acquisition unit 31 stores the acquired image data in the storage unit 39. The score data acquisition unit 32 acquires score data input from the score input unit 20 as game state data. The score data acquisition unit 32 stores the score data in the storage unit 39 in association with input time at which the score data was input.

By storing image data and chat data with the server 30, the image data and the chat data are uploaded to the server 30. When the server 30 stores the chat data therein, the server 30 includes data of time (hereinafter referred to as "upload time") at which the chat data was stored in the chat data. Specifically, the chat data uploaded to the server 30 includes data of the upload time. The server 30 includes a management application managing image data and chat data.

The chat data processor 33 stores chat data input from the chat terminal device 40 in the storage unit 39. In addition, when score data is acquired with the score data acquisition unit 32, the chat data processor 33 generates chat data of contents corresponding to the score data. In this case, the chat data processor 33 is, for example, capable of generating chat data indicating contents of the score data with characters or the like. This structure enables, when score data is updated, checking of the updated score data as information of the chat.

The tag information setting unit 34 sets tag information for each of a plurality of pieces of image data acquired with the image data acquisition unit 31. The tag information includes tag ranges and evaluation points. Each of the tag ranges is a range of time corresponding to the input time at which the score data was input in each of the pieces of image data. Each of the tag ranges is set to include, for example, the scene in which the situation corresponding to the score data has occurred in the game. The input time of the score data is the time after the corresponding batting result or the like in the game has been settled. For this reason, in the present embodiment, each of the tag ranges may be, for example, a range of the time having the input time of the score data as the finish time and the time obtained by tracing back from the input time by a predetermined time as the start time.

An evaluation point is set for each of the tag ranges. The evaluation point is a value to weight the tag range. In the following explanation, as the evaluation point increases, the tag range is weighted more. The form of setting of the evaluation point is not limited to the structure described above, but may be another form.

The following is an explanation of a method for setting the evaluation points. The tag information setting unit 34 is capable of setting the evaluation points in accordance with the user of the chat terminal device 40. In this case, for example, the tag information setting unit 34 is capable of setting the evaluation points on the basis of user characteristic information set by the user in the chat terminal device 40. With respect to the user characteristic information, for example, when a favorite player of the user's family member, friend, or the like is set in the chat terminal device 40, information of the favorite player may be used as the user characteristic information. The user characteristic information may be of another form.

When the positions of the cameras 10 and the chat terminal device 40 can be detected, the tag information setting unit 34 is capable of setting the evaluation points, for example, on the basis of the positions of the cameras 10 shooting the game and the position of the chat terminal device 40 of the user. The positions of the cameras 10 and the chat terminal device 40 can be achieved by, for example, providing position detection units or the like capable of detecting respective positions of the cameras 10 and the chat terminal device 40. In this case, the tag information setting unit 34 is capable of setting, for example, a low evaluation point for the tag range of the shot data of the camera 10 disposed in a position close to the chat terminal device 40 of the user, and setting a high evaluation point for the tag range of the shot data of the camera 10 disposed in a position distant from the chat terminal device 40 of the user. In this manner, a high evaluation point is set for image data different from the user's viewpoint.

In addition, when the chat terminal device 40 of the user is present in the site of the game, that is, when the user is in the site of the game, the tag information setting unit 34 is capable of setting a low evaluation point for the overall image close to the user's viewpoint in a plurality of pieces of image data, and setting a high evaluation point for a zoom image different from the user's viewpoint.

In addition, the tag information setting unit 34 is capable of setting the evaluation points, not depending on the user of the chat terminal device 40. In this case, for example, the tag information setting unit 34 is capable of setting the evaluation points on the basis of the contents of the score data and the positions of the cameras 10. Specifically, when a right-handed batter makes a hit, the tag information setting unit 34 is capable of setting a high evaluation point for image data shot with the camera located on the left field side and capable of shooting the right-handed batter from the front side, and setting a low evaluation point for image data shot with the camera 10 on the right field side. In the same manner, when a left-handed batter makes a hit, the tag information setting unit 34 is capable of setting a high evaluation point for image data shot with the camera 10 located on the right field side and capable of shooting the left-handed batter from the front side, and setting a low evaluation point for image data shot with the camera 10 on the left field side.

Figure 2:
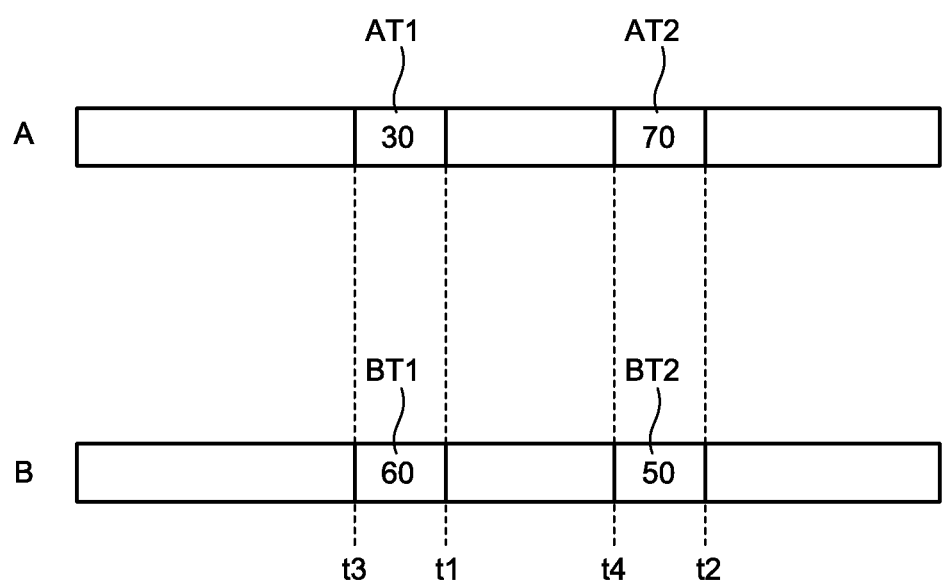
FIG. 2 is a diagram schematically illustrating an example of tag information.

FIG. 2 is a diagram schematically illustrating an example of the tag information. FIG. 2 illustrates the case of acquiring image data A and image data B shot with the two cameras 10, as an example. As illustrated in FIG. 2, in the image data A and the image data B, tag ranges AT1, AT2, BT1, and BT2 are set. The tag ranges AT1, AT2, BT1, and BT2 have finish times being input times t1 and t2 at which the score data was input. In the tag ranges AT1 and AT2, time t3 and time t4 are set as the start times, respectively. The time t3 and time t4 are obtained by tracing back from the finish times t1 and t2 by a predetermined time, respectively. In the image data A, an evaluation point of 30 is set for the tag range AT1, and an evaluation point of 70 is set for the tag range AT2. By contrast, in the image data B, an evaluation point of 60 is set for the tag range BT1, and an evaluation point of 50 is set for the tag range BT2.

With respect to setting of the start time of each of the tag ranges AT1, AT2, BT1, and BT2, for example, when a batting result, such as a one-base hit and a two-base hit, occurs in the game, the batting result is settled as a result of a pitch by the pitcher, batting and base running by the batter, and advance to first base or second base or the like. Accordingly, the input times t1 and t2 in the case where the score data is input is the time after the batting result is settled.

For this reason, the tag information setting unit 34 is capable of displaying display data starting from the time at which a series of scenes of the batting result start, or time close to the time, by setting the start times t3 and t4 obtained by tracing back from the input times t1 and t2 of the score data by a predetermined time P1. The predetermined time P1 may be set in advance, or may be set by the tag information setting unit 34.

The tag information setting unit 34 may set the predetermined time P1 longer, for example, as the volume of the chat data processed with the chat data processor 33 increases. When the volume of the chat data is large, that is, when the number of characters or the like included in the chat is large, it is considered that the input time for the chat data increases, and the time from settlement of the batting result to upload of the chat increases. For this reason, the tag information setting unit 34 determines that the time ranging from settlement of the batting result to upload of the chat increases as the volume of the chat data increases, and sets the predetermined time P1 longer. The length of the predetermined time P1 set in this case can be properly changed according to the type of the sports competition or the like. As another example, the operator may be enabled to set the predetermined time P1 as desired.

The server side communication unit 35 is capable of communicating with the chat terminal device 40. The server side communication unit 35 is capable of transmitting, for example, chat data and image data stored in the storage unit 39.

The image data selection unit 36 selects one piece of image data from the pieces of image data stored in the storage unit 39 in accordance with the evaluation point, and causes the server side communication unit 35 to transmit the piece of image data to the chat terminal device 40. For example, when chat data corresponding to a server message generated with the chat data processor 33 is designated in the chat terminal device 40, the tag ranges corresponding to the designated chat data are detected. The image data selection unit 36 selects a piece of image data to be transmitted to the chat terminal device 40 from the pieces of image data shot with the cameras 10, on the basis of the evaluation points set for the tag ranges. The image data selection unit 36 causes the server side communication unit 35 to transmit the image data starting from the start time of the tag range corresponding to the designated chat data in the selected piece of image data to the chat terminal device 40.

In the example of the image data A and B illustrated in FIG. 2, when the designated chat data corresponds to the tag ranges AT1 and BT1, the image data selection unit 36 compares the evaluation points of the tag range AT1 and the tag range BT1. The evaluation point of the tag range AT1 is 30, and the evaluation point of the tag range BT1 is 60. Accordingly, the evaluation point of the tag range BT1 is higher than that of the tag range AT1. In this case, the image data selection unit 36 selects the image data B including the tag range BT1 with the higher evaluation point, and transmits the image data starting from the start time of the tag range BT1 to the chat terminal device 40 through the server side communication unit 35.

The storage unit 39 stores therein a plurality of pieces of image data acquired with the image data acquisition unit 31, the score data acquired with the score data acquisition unit 32, and the chat data processed with the chat data processor 33. The image data includes data indicating images of the game shot for the baseball game. The image data includes data indicating the shot time at which images of the game was shot.

FIG. 3 is a diagram illustrating an example of chat data stored in the storage unit 39. As illustrated in FIG. 3, the chat data includes an input ID 75, an inputter ID 76, input contents 77, and tag information 78.

An input ID 75 is prepared every time chat data is input to the server 30 or generated. The inputter ID 76 is information identifying the inputter in one piece of chat data. For example, in the case of chat data generated with the server 30, the inputter ID 76 may be a predetermined value (for example, "999"). The input contents 77 is information indicating the contents of the message displayed in a chat display region 42b of the terminal device 40 described later. The input contents 77 includes, for example, character data or predetermined picture data. The tag information 78 is information identifying chat data prepared for each input ID 75. One piece of tag information 78 is prepared every time an input ID 75 is prepared. The pieces of tag information 78 are provided with respective tag numbers (TC0054, TC0055, . . . ) as indexes in the ascending order. The ID number of the input ID 75 may be used as the tag information.

The storage unit 39 stores synchronous data associating the score data with the chat data therein. FIG. 4 is a diagram illustrating an example of synchronous data stored in the storage unit 39. As illustrated in FIG. 4, the synchronous data includes tag information 79 and processing time information 80. The tag information 79 is information corresponding to the tag information 78 of the chat data described above. Pieces of the tag information 79 are disposed in order along the processing time information 80. For example, the tag information 79 is provided with the same tag number (TC0054, TC0055, . . . , TC0061) as that of the corresponding tag information 78, but is not limited thereto. The processing time information 80 is information associated with the tag information 79, and information indicating the processing time of the chat data. The processing time of the chat data may be, for example, the upload time at which the chat data was uploaded to the server 30. As another example, the processing time of the chat data may be the input start time at which input of the chat data was started. With the tag information 79 and the processing time information 80, the image data and the chat data are stored in association on the basis of the shooting time and the processing time.

The storage unit 39 stores an image data processing program therein. The image data processing program causes the server to execute processing of acquiring a plurality of pieces of image data acquired by shooting the game with the cameras 10, processing of acquiring score data of the game, processing of generating chat data of contents corresponding to score data when score data is acquired, processing of setting tag ranges each serving as a range of time corresponding to the input time at which the score data was input and the evaluation points for the respective tag ranges, for each of the acquired pieces of image data, as tag information, processing of storing chat data and the pieces of image data for each of which tag information has been set, processing of transmitting the chat data and the selected image data to the chat terminal device 40, and processing of selecting one piece of image data from the stored pieces of image data on the basis of the evaluation points set for the tag ranges corresponding to the designated chat data, when one piece of the chat data generated in accordance with the score data is designated in the chat terminal device 40, and transmitting the selected image data from the server 30 side communication unit to the chat terminal device 40.

Each of the chat terminal devices 40 and 40A includes an input unit 41, a display unit 42, a communication unit 43, a storage unit 44, and a controller 45. The input unit 41, the display unit 42, the communication unit 43, the storage unit 44, and the controller 45 are connected with each other via, for example, a bus line or the like. An example of the chat terminal device 40 is a mobile information terminal, such as a mobile phone, a smartphone, a tablet computer, and a notebook personal computer.

The input unit 41 is capable of performing a predetermined input operation to input information, such as the chat data. The input unit 41 outputs an instruction signal to the controller 45 in response to the input operation. For example, an input device, such as a touch panel, is used as the input unit 41. As the input unit 41, a button, a lever, a dial, a switch, or another input device may be used, in addition to or instead of the touch panel. The input unit 41 outputs an instruction signal corresponding to the predetermined input operation. The display unit 42 displays various types of information including characters and images. The display unit 42 includes a display panel, such as a liquid crystal panel. The display unit 42 is capable of displaying information including images.

Figure 5:
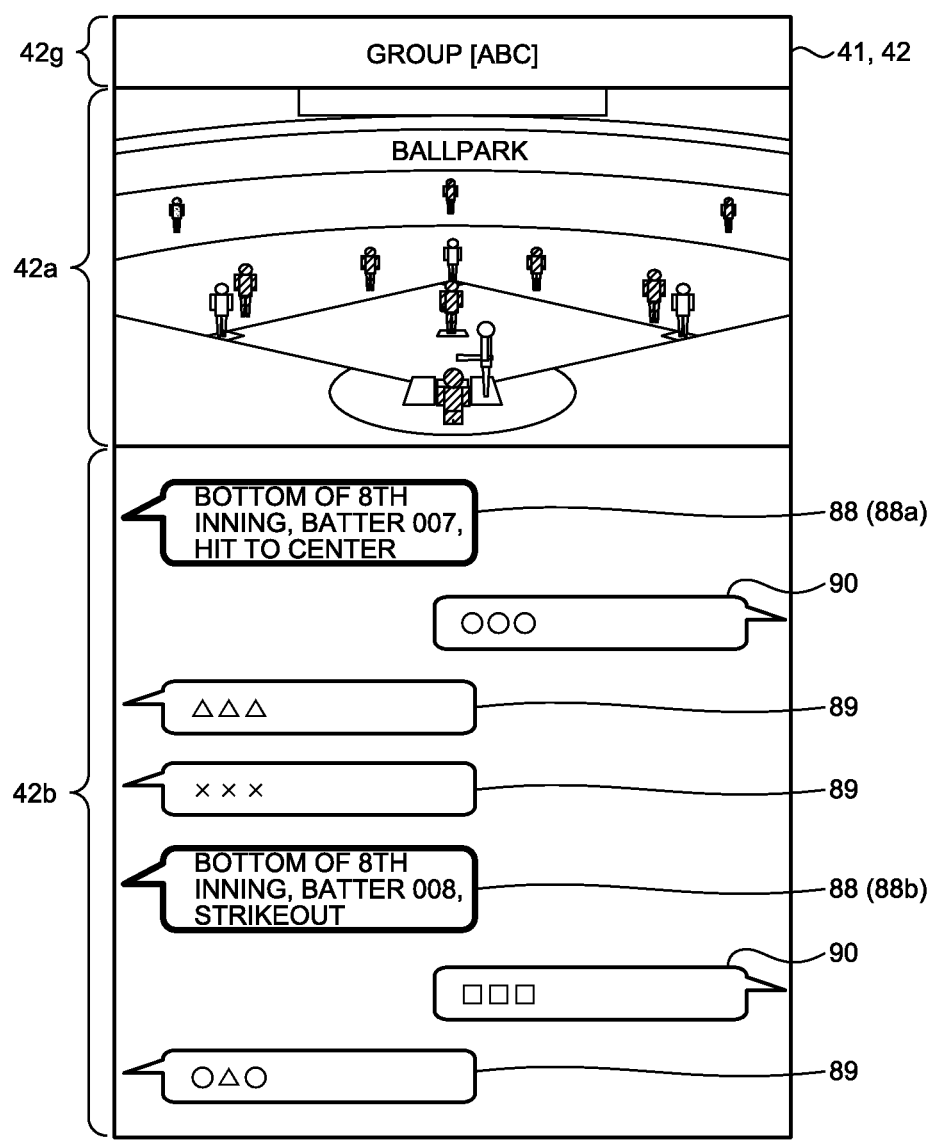
FIG. 5 is a diagram illustrating an example of an input unit and a display unit of a chat terminal device according to the first embodiment.

FIG. 5 is a diagram illustrating an example of the input unit 41 and the display unit 42 of the chat terminal device 40 according to the present embodiment. As illustrated in FIG. 5, the chat terminal device 40 includes, for example, the input unit 41 of a touch-panel type and the display unit 42. Specifically, a touch panel serving as the input unit 41 is superimposed on a display panel serving as the display unit 42.

The display unit 42 displays, for example, an image display region 42a, a chat display region 42b, and a group display region 42g. Image data is displayed in the image display region 42a. A scroll bar or the like to designate the playback time of the image data may be displayed in the image display region 42a.

Chat data is displayed in the chat display region 42b. For example, server messages 88 serving as chat data generated with the server 30, others messages 89 serving as chat data input with another chat terminal device 40A different from the chat terminal device 40, and user's own messages 90 serving as chat data input with the chat terminal device 40 are displayed in the chat display region 42b. For example, each of the server messages 88 is a message indicating the contents of the score data input to the server 30 with a text. A server message 88a on the upper side in FIG. 5 has contents, for example, indicating that the batter 007 made a hit to center at the bottom of the eighth inning. A server message 88b in the lower side in FIG. 5 has contents, for example, indicating that the batter 008 was struck out at the bottom of the eighth inning.

The server messages 88 and the others messages 89 are displayed in, for example, a left region in the chat display region 42b. The user's own messages 90 are displayed in, for example, a right region in the chat display region 42b. The server messages 88 and the others messages 89 may be displayed to be distinguished from each other, for example, they are displayed in message display frames of different types. This structure enables distinction between the server messages 88 and the others messages 89. Information of the group to which the operator of the chat terminal device 40 belongs is displayed in the group display region 42g. The server messages 88, the others messages 89, and the user's own messages 90 are displayed in frames, such as balloons. The balloons are displayed in a larger size horizontally and vertically in the chat display region 42b, for example, as the number of characters increases.

When an operation, such as a touch operation and a scroll operation, is performed in a predetermined region on the surface of the touch panel, the input unit 41 outputs a predetermined instruction signal including positional information of the region on which the operation has been performed and operation details. The positional information is set, for example, in correspondence with the position of the display unit 42. The structures of the input unit 41 and the display unit 42 are not limited to the structures described above.

The communication unit 43 performs information communications with an external device in a wired or wireless manner. The communication unit 43 transmits and receives image data, chat data, and score data and the like to and from the external server 30 or the like.

The storage unit 44 includes a storage, such as a hard disk drive and a solid state drive. An external storage medium, such as a removable disk, may be used as the storage unit 44. The storage unit 44 may store therein various computer programs to control operations of the operating system of the chat terminal device 40, the input unit 41, the display unit 42, and the communication unit 43, a chat application to perform chat, various computer programs, and data and the like. For example, the storage unit 44 may store therein frame data and the like of the image display region 42a, the chat display region 42b, and the group display region 42g to be displayed on the display unit 42.

The controller 45 controls each unit of the input unit 41, the display unit 42, and the communication unit 43. The controller 45 also performs arithmetic operations, processing, and the like corresponding to the instruction signal output with the input unit 41. The controller 45 includes a processing device, such as a central processing unit (CPU), and a storage device, such as random access memory (RAM) and a read only memory (ROM). The controller includes a data acquisition controller 54, a storage controller 55, and a display controller 56.

The data acquisition controller 54 accesses the server 30 via the communication unit 43, and acquires chat data, image data, and/or digest data and the like stored in the storage unit 39 of the server 30.

The storage controller 55 stores the image data and the chat data acquired from the server 30 in the storage unit 44 in association with each other on the basis of the shooting time and the processing time.

The display controller 56 controls the display contents displayed on the display unit 42. The display controller 56 controls the display contents in the image display region 42a on the basis of the image data acquired with the communication unit 43. In addition, when a scroll bar to designate the playback time is displayed in the image display region 42a, the display controller 56 displays image data starting from the playback time designated with the scroll bar in the image display region 42a.

The display controller 56 also controls the display contents in the chat display region 42b on the basis of the chat data acquired with the communication unit 43. When the chat data is displayed in the chat display region 42b, the display controller 56 displays pieces of chat data of the number that can be displayed in the chat display region 42b in line in one direction in a time-series manner on the basis of the upload time. In the present embodiment, as illustrated in FIG. 5, for example, pieces of chat data are displayed in line from the upper side to the lower side in the chat display region 42b in the drawing in a time-series manner.

In addition, when a new piece of chat data is stored in the storage unit 39 of the server 30, the display controller 56 acquires the newest chat data stored in the storage unit 39 via the communication unit 43, and updates the display contents of the chat display region 42b. In this case, the display controller 56 determines whether any space to display the new chat data exists under the last displayed chat data in time series in the chat display region 42b. When any space to display the new chat data exists, the display controller 56 displays the new chat data in the space. When no space to display the new chat data exists, the display controller 56 scrolls the whole chat display region 42b in a direction of pushing out the oldest chat data in time series in the chat data displayed in the chat display region 42b, that is, the uppermost chat data displayed in the chat display region 42b, upward to the outside of the chat display region 42b. Thereafter, the display controller 56 displays the new chat data in a space generated in the lower part by scroll. This structure enables the display controller 56 to update the chat data displayed in the chat display region 42b in real time, every time a new piece of chat data is uploaded to the server 30 and stored in the storage unit 44.

In addition, the display controller 56 is capable of controlling the display contents in the chat display region 42b on the basis of the past chat data stored in the storage unit 44. For example, when the operator slides the touch position upward or downward in the state in which the operator touches a part in the chat display region 42b of the input unit (touch panel) 41, that is, when the operator performs an operation of manually scrolling the chat display region 42b, the display controller 56 changes the chat data displayed in the chat display region 42b in accordance with the scroll direction and the scroll quantity. For example, when the operator slides the touch position upward, chat data uploaded later than the chat data displayed up to the operation is displayed in the chat display region 42b. In addition, when the operator slides the touch position downward, chat data uploaded earlier than the chat data displayed up to the operation is displayed in the chat display region 42b. The method for changing the chat data displayed in the chat display region 42b is not limited thereto, but may be performed by another method, such as a button, a keyboard, and a mouse.

In addition, in the present embodiment, when one server message is designated with the input unit 41 in the chat data displayed in the chat display region 42b, the display controller 56 transmits information indicating that the server message has been designated to the server 30. In this case, in the server 30, image data is selected with the image data selection unit 36 on the basis of the evaluation points of the tag ranges, and the selected image data is transmitted to the chat terminal device 40, as described above. In the chat terminal device 40, the transmitted image data is received with the communication unit 43. The display controller 56 is capable of displaying the received image data in the image display region 42a.

Figure 6:
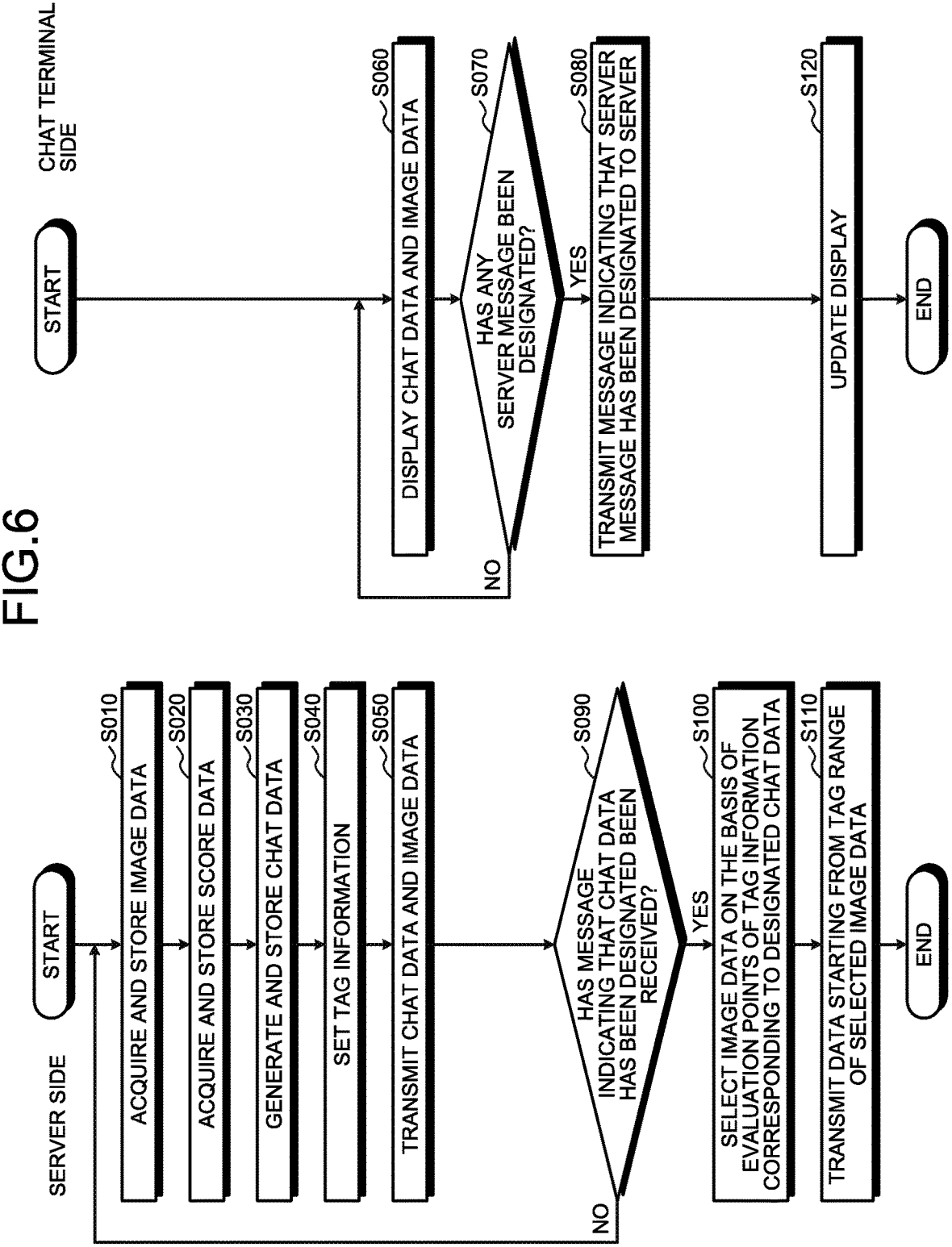
FIG. 6 includes a set of flowcharts illustrating an example of a chat display method according to the first embodiment.

The following is an explanation of operations of the chat system 100 configured as described above. FIG. 6 includes a set of flowcharts illustrating an example of a chat display method according to the first embodiment. FIG. 6 illustrates flowcharts separately for the server 30 side and the chat terminal device 40 side.

As illustrated in FIG. 6, in the server 30, the image data acquisition unit 31 acquires a plurality of pieces of image data input from the cameras 10, and stores the pieces of image data in the storage unit 39 (Step S010). The score data acquisition unit 32 acquires score data input from the score input unit 20, and stores the score data in the storage unit 39 (Step S020). The chat data processor 33 generates chat data of contents corresponding to the score data every time score data is input, and stores the chat data in the storage unit 39 (Step S030). In addition, when score data is acquired, the tag information setting unit 34 sets tag ranges and evaluation points as tag information (Step S040). The server side communication unit 35 transmits the chat data and the image data stored in the storage unit 39 (Step S050).

The chat terminal device 40 receives the chat data and the image data transmitted from the server 30, and displays them on the display unit 42 (Step S060). The display controller 56 determines whether any server message displayed on the display unit 42 has been designated (Step S070). When it is determined that no server message displayed on the display unit 42 has been designated (No at Step S070), the processing at and after Step S060 is performed repeatedly. When it is determined that any server message displayed on the display unit 42 has been designated (Yes at Step S070), the display controller 56 transmits a message indicating that the server message has been designated to the server 30 (Step S080).

On the server 30 side, it is determined whether any message indicating that a server message has been designated has been received (Step S090). When it is determined that no message indicating that a server message has been designated has been received (No at Step S090), the processing at and after Step S010 is repeated. When it is determined that any message indicating that a server message has been designated has been received (Yes at Step S090), the image data selection unit 36 detects tag ranges of the chat data corresponding to the designated server message, and selects image data to be transmitted to the chat terminal device 40 in the pieces of image data, on the basis of the evaluation points set for the tag ranges (Step S100). The image data selection unit 36 transmits image data starting from the start time of the tag range corresponding to the designated chat data in the selected image data from the server side communication unit 35 to the chat terminal device 40 (Step S110).

On the chat terminal device 40 side, display in the image display region 42a of the display unit 42 is updated with the image data transmitted from the server 30 (Step S120).

As described above, the chat system 100 according to the first embodiment includes the server 30 and the chat terminal device 40; the server 30 includes the image data acquisition unit 31 acquiring a plurality of pieces of image data acquired by shooting a game with a plurality of cameras 10, the score data acquisition unit 32 acquiring score data of the game, the chat data processor 33 generating chat data of contents corresponding to the score data when score data is acquired, the tag information setting unit 34 setting tag ranges each serving as a range of time corresponding to input time at which score data has been input and evaluation points for the respective tag ranges, for each of the acquired pieces of image data, as tag information, the storage unit 39 storing therein the chat data and the pieces of image data for each of which the tag information has been set, the server side communication unit 35 capable of transmitting the chat data and the image data stored in the storage unit 39 to the chat terminal device 40, and the image data selection unit 36 selecting, when one piece of the chat data generated with the chat data processor 33 is designated in the chat terminal device 40, one piece of image data from the pieces of image data stored in the storage unit 39 on the basis of the evaluation points set for the tag ranges corresponding to the designated chat data, and transmitting the selected image data from the server side communication unit to the chat terminal device 40; and the chat terminal device 40 includes the communication unit acquiring the chat data and the image data from the server 30, and the display controller 56 displaying the acquired image data and the acquired chat data in different regions in the display unit 42 and, when one piece of the chat data generated with the chat data processor 33 and displayed on the display unit 42 is designated with the input unit 41, transmitting a message indicating that the chat data has been selected to the server 30, receiving the image data selected with the image data selection unit 36 from the server 30, and displaying the image data on the display unit 42.

According to the present embodiment, the server 30 selects and transmits a piece of image data having a high evaluation point of the tag range set for each of the pieces of image data, in the pieces of image data acquired from the cameras 10. This structure enables supply of an image valuable for the user.

In the chat system 100 according to the present embodiment, the tag information setting unit 34 sets the evaluation points on the basis of the user related information concerning the user of the chat terminal device 40. This structure enables setting of the evaluation points in accordance with the user. This structure enables selection of image data more corresponding to the user in the image data selection unit 36.

In the chat system 100 according to the present embodiment, the tag information setting unit 34 sets the evaluation points in accordance with the position of the chat display terminal and the positions of a plurality of shooting devices. This structure enables easy selection of image data shot from a viewpoint different from the user's viewpoint in the image data selection unit 36.

Second Embodiment

The following is an explanation of a second embodiment. In the present embodiment, a schematic structure of the chat system 100 is the same as the first embodiment as illustrated in FIG. 1. In the present embodiment, the display form in the chat terminal device 40 for the chat data generated with the chat data processor 33 is different from that of the embodiment described above.

When score data is acquired, the chat data processor 33 generates chat data having contents corresponding to the score data, and sets the display form of the server messages 88 serving as the chat data in the chat terminal device 40 in accordance with the evaluation point. The chat data processor 33 stores the set display form in the storage unit 39 in association with the chat data.

The storage unit 39 stores therein the display form set with the chat data processor 33 in association with the chat data. In addition, the storage unit 39 stores a chat data processing program therein. The chat data processing program causes the server to execute processing of acquiring a plurality of pieces of image data acquired by shooting the game with the cameras 10, processing of acquiring score data of the game, processing of setting tag ranges each serving as a range of time corresponding to the input time at which the score data was input and the evaluation points for the respective tag ranges, for each of the acquired pieces of image data, as tag information, processing of generating chat data of contents corresponding to score data when score data is acquired, and setting the display form of the chat data in the chat display terminal in accordance with the evaluation points, processing of storing chat data and the pieces of image data for each of which tag information has been set, processing of transmitting the chat data and the selected image data to the chat terminal device 40, and processing of selecting one piece of image data from the stored pieces of image data on the basis of the evaluation points set for the tag ranges corresponding to the designated chat data, when one piece of the chat data generated in accordance with the score data is designated in the chat terminal device 40, and transmitting the selected image data from the server 30 side communication unit to the chat terminal device 40.

In the chat terminal device 40, the display controller 56 receives the chat data and the image data transmitted from the server 30, and displays the chat data and the image data on the display unit 42. In the processing, the display controller 56 displays the chat data, in the display form set in the server 30, in the chat display region 42b.

In addition, when one server message is designated with the input unit 41 in the chat data displayed in the chat display region 42b, the display controller 56 transmits information indicating that the server message has been designated to the server 30. In this case, in the server 30, image data is selected with the image data selection unit 36, and the selected image data is transmitted to the chat terminal device 40. In this case, the image data selection unit 36 is not limited to the case of selecting image data on the basis of the evaluation points of the tag ranges, but is capable of selecting image data on the basis of another standard. In the chat terminal device 40, the transmitted image data is received with the communication unit 43. The display controller 56 is capable of displaying the received image data in the image display region 42a. When the image data to be received is changed, the evaluation points of the tag ranges set for the image data are also changed. For this reason, the display controller 56 updates display in the chat display region 42b to acquire the display form based on the evaluation points of the tag ranges set for the changed image data.

Each of the server messages 88 includes text data for the text describing the contents of the score data, and balloon data for the balloon enclosing the text (see FIG. 5). Examples of the display form of the server messages 88 include the form of changing the display of the color, the font, and/or the size of the text itself indicating the message contents, and/or the form of changing the display of at least one of the color, the shape, and the size of the balloon. As another example, when a specific server message 88 is displayed in the case where the chat display region 42b is scrolled, scroll may be automatically stopped.

Figure 7:
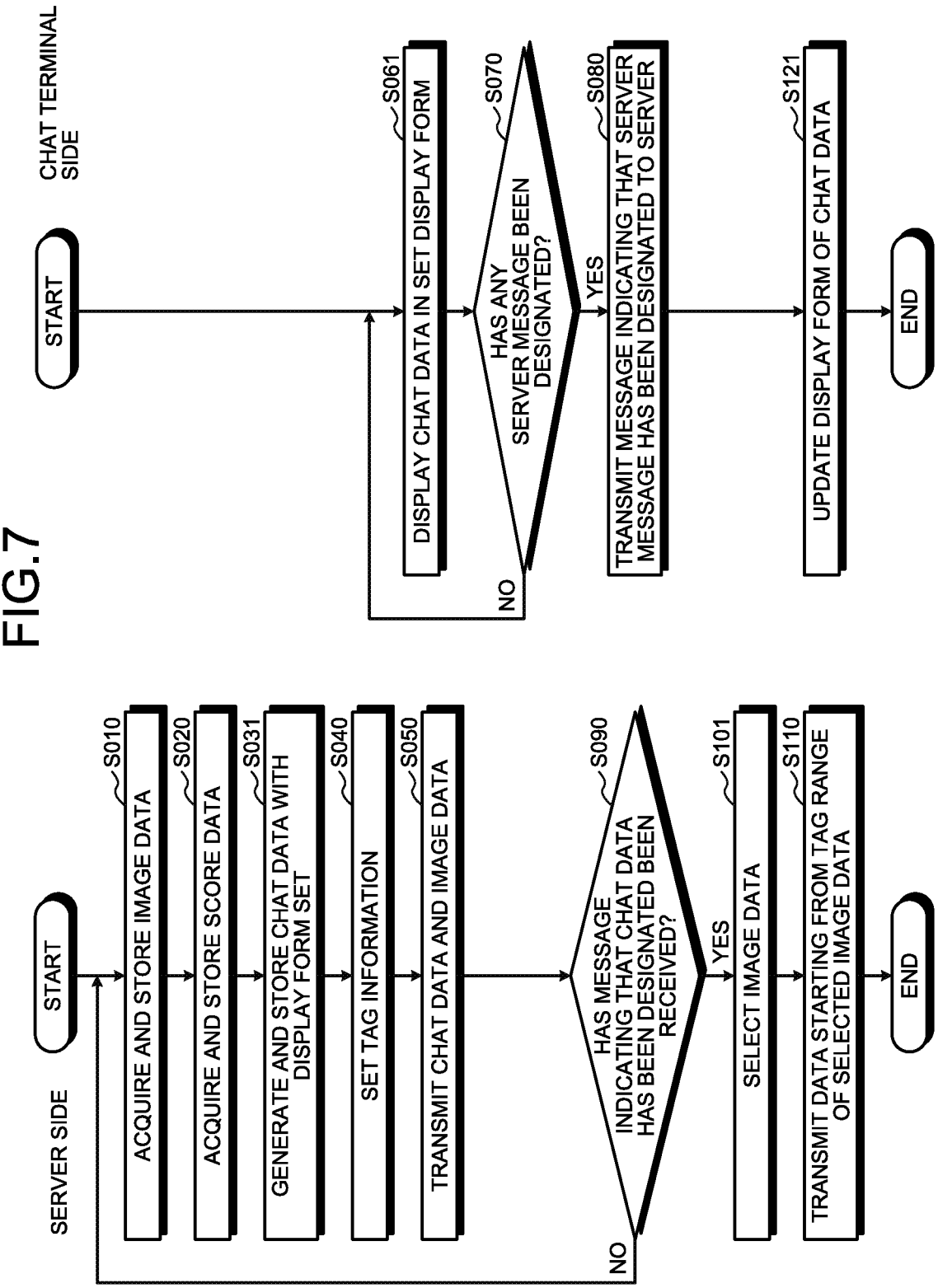
FIG. 7 includes a set of flowcharts illustrating an example of a chat display method according to a second embodiment.

FIG. 7 includes a set of flowcharts illustrating an example of the chat display method according to the second embodiment. FIG. 7 illustrates flowcharts separately for the server 30 side and the chat terminal device 40 side, in the same manner as FIG. 6.

As illustrated in FIG. 7, in the server 30, the image data acquisition unit 31 acquires a plurality of pieces of image data input from the cameras 10, and stores the pieces of image data in the storage unit 39 (Step S010), in the same manner as the first embodiment. In addition, the score data acquisition unit 32 acquires score data input from the score input unit 20, and stores the score data in the storage unit 39 (Step S020). Every time score data is input, the chat data processor 33 generates chat data having contents corresponding to the score data, sets the display form of the chat data in the chat terminal device in accordance with the evaluation point, and stores them in the storage unit 39 (Step S031). Thereafter, the tag information setting unit 34 sets tag ranges and evaluation points as tag information (Step S040).

The server side communication unit 35 transmits the chat data and the image data stored in the storage unit 39 (Step S050).

The chat terminal device 40 receives the chat data and the image data transmitted from the server 30, and displays the chat data and the image data on the display unit 42. In this case, the display controller 56 displays the chat data, in the set display form, in the chat display region 42b (Step S061). Thereafter, in the same manner as the first embodiment, the display controller 56 determines whether any server message displayed in the display unit 42 has been designated (Step S070). When it is determined that no server message displayed on the display unit 42 has been designated (No at Step S070), the processing at and after Step S061 is performed repeatedly. When it is determined that any server message displayed on the display unit 42 has been designated (Yes at Step S070), the display controller 56 transmits a message indicating that the server message has been designated to the server 30 (Step S080).

On the server 30 side, in the same manner as the first embodiment, it is determined whether any message indicating that a server message has been designated has been received (Step S090). When it is determined that no message indicating that a server message has been designated has been received (No at Step S090), the processing at and after Step S010 is repeated. When it is determined that any message indicating that a server message has been designated has been received (Yes at Step S090), the image data selection unit 36 detects tag ranges of the chat data corresponding to the designated server message, and selects image data to be transmitted to the chat terminal device 40 in the pieces of image data (Step S101). At Step S101, the element to be used for selection is not limited to the evaluation points, but image data may be selected by any method. Image data may be selected on the basis of the evaluation points. Step S110 is the same as that of the first embodiment.

On the chat terminal device 40 side, display in the image display region 42a of the display unit 42 is updated with the image data transmitted from the server 30. In addition, when the evaluation values of the tag ranges of the image data transmitted from the server are changed, the display form of the chat data in the chat display region 42b is updated (Step S121).

The chat system 100 according to the present embodiment includes the server 30 and the chat terminal device 40; the server 30 includes the image data acquisition unit 31 acquiring a plurality of pieces of image data acquired by shooting a game with a plurality of cameras 10, the score data acquisition unit 32 acquiring score data of the game, the tag information setting unit 34 setting tag ranges each serving as a range of time corresponding to input time at which score data has been input and evaluation points for the respective tag ranges, for each of the acquired pieces of image data, as tag information, the chat data processor 33 generating chat data of contents corresponding to score data when score data is acquired, and setting the display form of the chat data in the chat display terminal in accordance with the evaluation point, the storage unit 39 storing therein the chat data and the pieces of image data for each of which the tag information has been set, the server side communication unit capable of transmitting the chat data and the image data stored in the storage unit 39 to the chat terminal device 40, and the image data selection unit selecting, when one piece of the chat data generated with the chat data processor is designated in the chat terminal device 40, one piece of image data from the pieces of image data stored in the storage unit 39, and transmitting the selected image data from the server side communication unit to the chat terminal device 40; and the chat terminal device 40 includes the communication unit 43 acquiring the chat data and the image data from the server 30, and the display controller displaying the acquired image data and the acquired chat data in different regions in the display unit 42, displaying the chat data generated with the chat data processor, in the set display form, in the display unit 42, and, when one piece of the chat data generated with the chat data processor and displayed on the display unit 42 is designated with the input unit 41, transmitting a message indicating that the chat data has been selected to the server 30, receiving the image data selected with the image data selection unit from the server 30, and displaying the image data on the display unit 42.

According to the present embodiment, the display form of each piece of the chat data (server message) is different according to the evaluation point. For this reason, when the evaluation point differs between the users, the display form is different between the users. This structure achieves the display form more suitable for the user's request.

In the chat system 100 according to the present embodiment, each piece of the chat data includes text data for the text describing the contents corresponding to the score data, and balloon data for the balloon displayed to enclose the text data, and the chat data processor 33 sets the display form such that at least one form of the color, the shape, and the size of the text and the balloon is different from that of the other pieces of chat data. This structure enables easy achievement of the display form suitable for the user's request.

Third Embodiment

Figure 8:
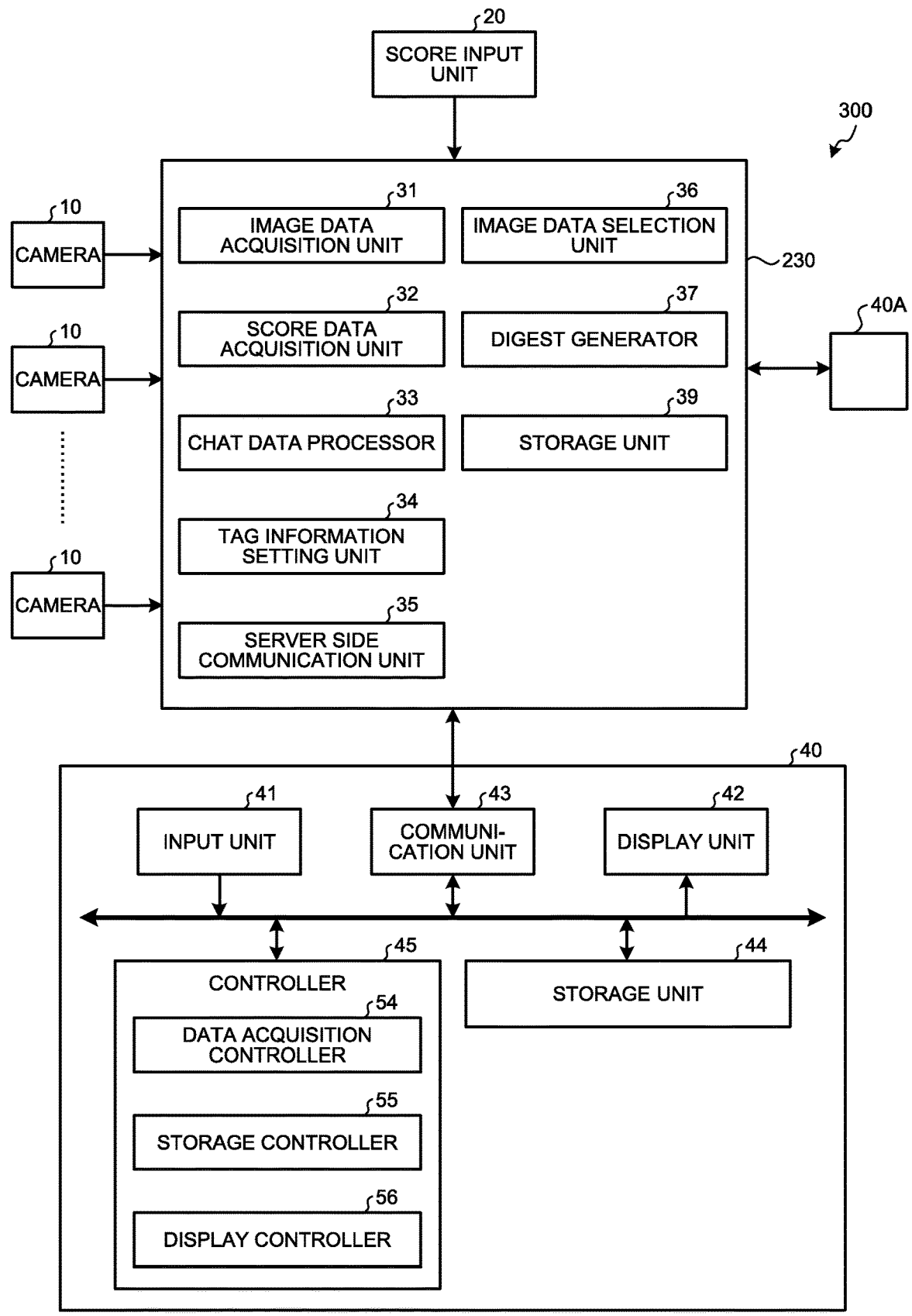
FIG. 8 is schematic diagram illustrating an example of a chat system according to a third embodiment.

The following is an explanation of a third embodiment. FIG. 8 is a schematic diagram illustrating an example of a chat system (image data processing system) 300 according to the present embodiment. As illustrated in FIG. 8, the chat system 300 includes a server (image data processing device) 230 and the chat terminal device (terminal device) 40. The structure of the chat terminal device 40 is the same as that of the embodiments described above. In the present embodiment, the server 230 includes a digest generator 37, in addition to the constituent elements of the first embodiment. The other constituent elements of the server 230 are the same as those of the first embodiment. In the present embodiment, the chat data processor 33 and the image data selection unit 36 may be omitted.

The digest generator 37 selects tag ranges set for a plurality of pieces of image data acquired with the image data acquisition unit 31 on the basis of the evaluation points, and connects the selected tag ranges in time series to generate one piece of digest data.

FIG. 9 is a diagram schematically illustrating an example of digest data. FIG. 9 illustrates the case of acquiring image data C and image data D, as an example. As illustrated in FIG. 9, tag ranges CT1, CT2, CT3, DT1, DT2, and DT3 are set in the image data C and the image data D. The respective finish times of the tag ranges CT1, CT2, CT3, DT1, DT2, and DT3 are input times t5, t6, and t7 at each of which score time was input. The tag ranges CT1, CT2, and CT3 are set with the respective start times being times t8, t9, and t10, respectively. The times t8, t9, and t10 are acquired by tracing back by a predetermined time from the finish times t5, t6, and t7, respectively. In the image data C, an evaluation point of 30 is set for the tag range CT1, an evaluation point of 70 is set for the tag range CT2, and an evaluation point of 20 is set for the tag range CT3. By contrast, in the image data D, an evaluation point of 60 is set for the tag range DT1, an evaluation point of 50 is set for the tag range DT2, and an evaluation point of 40 is set for the tag range DT3.

For example, the digest generator 37 selects one of the tag ranges corresponding to the same score data in the pieces of image data on the basis of the evaluation point. For example, as illustrated in FIG. 9, when digest data E is generated, the digest generator 37 compares the evaluation values of the two tag ranges CT1 and DT1 corresponding to the same score data, and selects the tag range DT1 with the higher evaluation value. In addition, the digest generator 37 compares the evaluation values of the two tag ranges CT2 and DT2 corresponding to the same score data, and selects the tag range CT2 with the higher evaluation value. The digest generator 37 also compares the evaluation values of the two tag ranges CT3 and DT3 corresponding to the same score data, and selects the tag range DT3 with the higher evaluation value. The digest generator 37 connects the selected tag ranges with each other. This operation generates digest data E in which the tag ranges DT1, CT2, and DT3 are connected.

In addition, when digest data F is generated, the digest generator 37 selects tag ranges each having the evaluation point equal to or larger than a predetermined value. For example, as illustrated in FIG. 9, when the digest data F is generated, the digest generator 37 selects tag ranges each having the evaluation point equal to or larger than 50. In the image data C and the image data D, the tag ranges DT1, CT2, and DT2 each having the evaluation point equal to or larger than 50 can be selected. The digest generator 37 connects the selected tag ranges with each other. This operation generates digest data F in which the tag ranges DT1, DT2, and CT2 are connected.

In addition, as another example, the digest generator 37 selects one of the tag ranges corresponding to the same score data in the pieces of image data on the basis of the evaluation points, and further selects the tag ranges each having the evaluation point equal to or larger than the predetermined value from the selected rag ranges. For example, as illustrated in FIG. 9, when digest data G is generated, the digest generator 37 is capable of comparing the evaluation values of the two tag ranges corresponding to the same score data, and selecting the tag ranges DT1, CT2, and DT3 each having the higher evaluation value. In this state, the tag ranges DT1, CT2, and DT3 are selected. Thereafter, the digest generator 37 further selects the tag ranges each having the evaluation point equal to or larger than 50 from the selected tag ranges. In this case, the tag ranges DT1 and CT2 are selected. The digest generator 37 connects the selected tag ranges with each other. This operation generates digest data G in which the tag ranges DT1 and CT2 are connected.

In addition, in the present embodiment, the storage unit 39 stores an image data processing program therein. The image data processing program causes the server to execute processing of acquiring a plurality of pieces of image data acquired by shooting the game with the cameras 10, processing of acquiring score data of the game, processing of setting tag ranges each serving as a range of time corresponding to the input time at which the score data was input and the evaluation points for the respective tag ranges, for each of the acquired pieces of image data, as tag information, processing of selecting the tag ranges set for the pieces of image data on the basis of the evaluation points, and connecting the selected tag ranges in time-series order to generate one piece of digest data, processing of storing the pieces of image data for each of which the tag information has been set and the digest data, and processing of transmitting the digest data and the image data stored in the storage unit 39.

Figure 10:
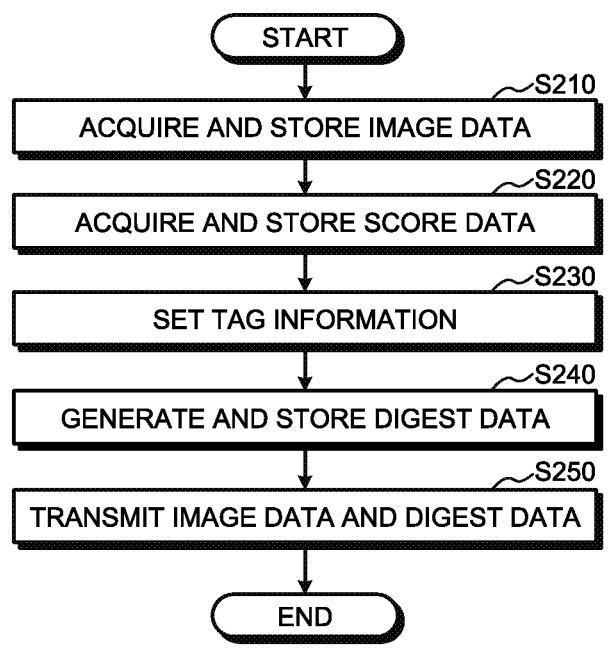
FIG. 10 is a flowchart illustrating an example of a chat display method according to the third embodiment.

The following is an explanation of operations of the chat system 300 structured as described above. FIG. 10 is a flowchart illustrating an example of the chat display method according to the third embodiment. As illustrated in FIG. 10, in the server 30, the image data acquisition unit 31 acquires a plurality of pieces of image data input from the cameras 10, and stored the pieces of image data in the storage unit 39 (Step S210). In addition, the score data acquisition unit 32 acquires score data input from the score input unit 20, and stores the score data in the storage unit 39 (Step S220). Every time score data is input, the chat data processor 33 generates chat data of contents corresponding to the score data, and stores the chat data in the storage unit 39. When score data is acquired, the tag information setting unit 34 sets tag ranges and evaluation points as the tag information (Step S230).

The digest generator 37 selects the tag ranges set for the pieces of image data on the basis of the evaluation points, connects the selected tag ranges in time-series order to generate one piece of digest data, and stores the digest data in the storage unit 39 (Step S240). The server side communication unit 35 transmits the chat data, the image data, and the digest data stored in the storage unit 39 (Step S250).

The chat system 300 according to the present embodiment includes the server 230 and the chat terminal device 40; the server 230 includes the image data acquisition unit 31 acquiring a plurality of pieces of image data acquired by shooting a game with a plurality of cameras 10, the score data acquisition unit 32 acquiring score data of the game, the tag information setting unit 34 setting tag ranges each serving as a range of time corresponding to input time at which score data has been input and evaluation points for the respective tag ranges, for each of the acquired pieces of image data, as tag information, the digest generator 37 selecting the tag ranges set for the pieces of image data on the basis of the evaluation points, and connecting the selected tag ranges in time-series order to generate one piece of digest image, the storage unit 39 storing therein the pieces of image data for each of which the tag information has been set and the digest data, and the server side communication unit 35 capable of transmitting the digest data and the image data stored in the storage unit 39; and the chat terminal device includes the communication unit 43 acquiring the digest data and the image data from the server 230, and the display controller 56 displaying the acquired digest data and the acquired image data in the display unit 42.

The present embodiment enables provision of a digest image different between the users, when the evaluation point is different between the users. For this reason, this structure enables supply of the image more suitable for the user's request, in images corresponding to the score designated by the user.

In the chat system 300 according to the present embodiment, the tag information setting unit 34 sets the evaluation point on the basis of the contents of the score data and the position of the imaging device. For this reason, a high evaluation point is set for the image data of the viewpoint different from the user's viewpoint.

In the chat system 300 according to the present embodiment, the digest generator 37 selects the tag ranges each having an evaluation point equal to or larger than the

Fourth Embodiment

Figure 11:
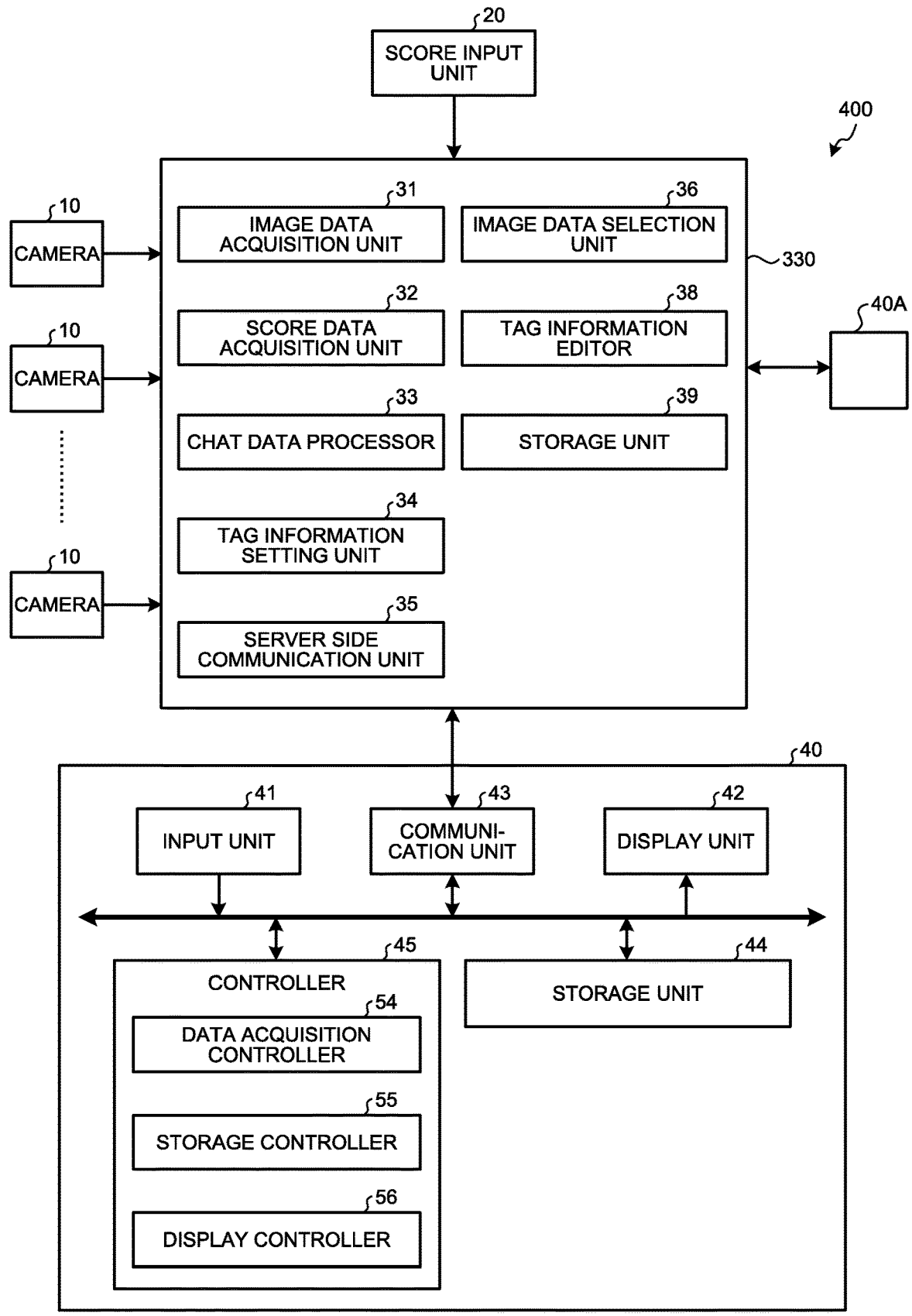
FIG. 11 is a schematic diagram illustrating an example of a chat system according to a fourth embodiment.

The following is an explanation of a fourth embodiment. FIG. 11 is a schematic diagram illustrating an example of a chat system 400 according to the present embodiment. As illustrated in FIG. 11, the chat system 400 includes a server 330 and the chat terminal device 40. The structure of the chat terminal device 40 is the same as those in the embodiments described above. In the present embodiment, the server 330 includes a tag information editor 38, in addition to the constituent elements according to the first embodiment. The other constituent elements of the server 230 are the same as those in the first embodiment.

The tag information editor 38 edits the tag information on the basis of a request, when it receives a request to change the setting of the tag information for the server message serving as the chat data generated with the chat data processor 33. Examples of the edit details of the tag information include deletion of the tag information, change of the tag range, and change of the evaluation point.

Deletion of the tag information is deleting the tag information set for the image data. Deletion of the tag information nullifies the tag range and the evaluation point of the score data corresponding to the tag information. The editor may be configured to be capable of restoring deleted tag information. Specifically, the editor may be set to switch the tag information between valid and invalid. Examples of change of the tag range include changing the start time and the finish time of the tag range. Examples of change of the evaluation point include increasing or decreasing the evaluation point set for the tag range.

Figure 12:
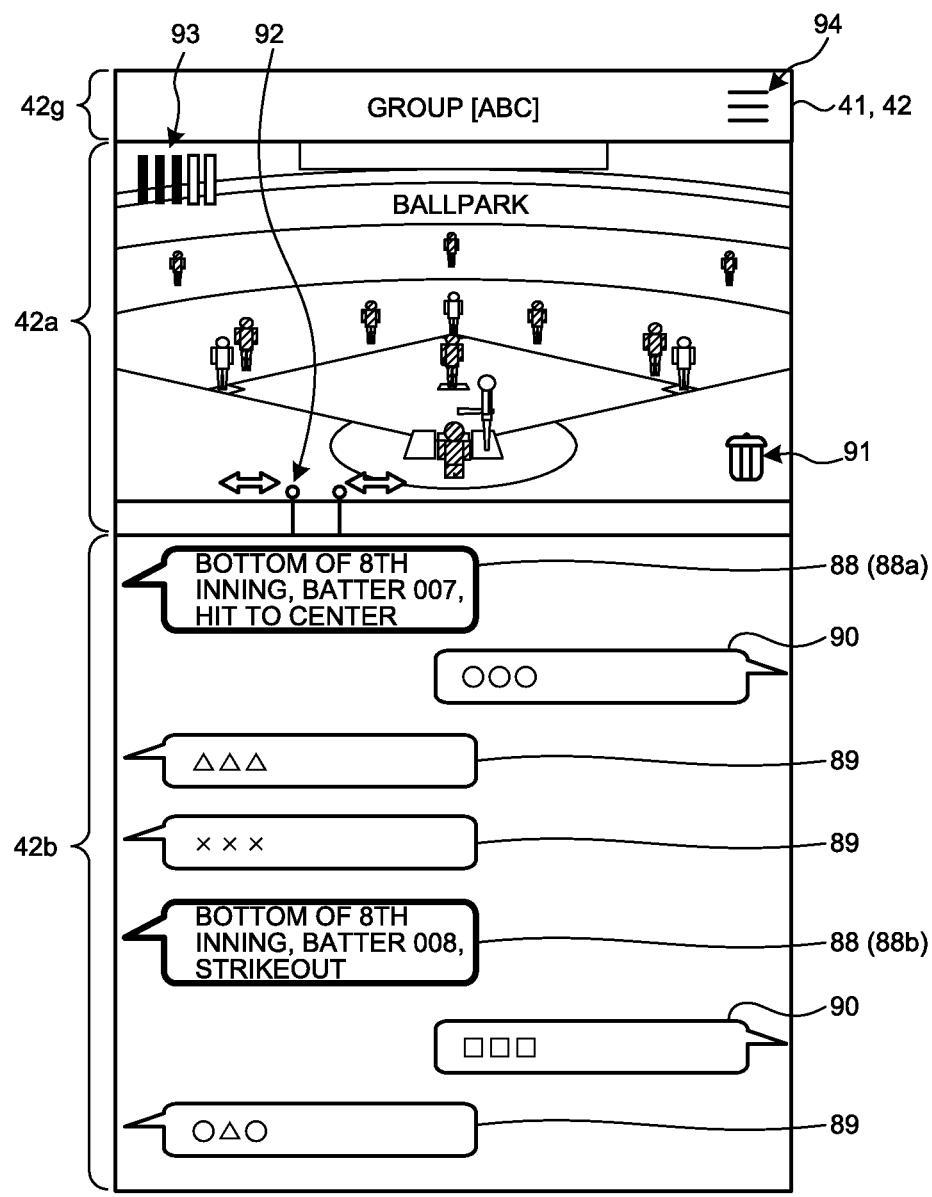
FIG. 12 is a diagram illustrating an example of an input unit and a display unit of a chat terminal device according to the fourth embodiment.

A request to change the tag information can be issued in the chat terminal device 40 side. FIG. 12 is a diagram illustrating an example of the input unit 41 and the display unit 42 of the chat terminal device 40 according to the present embodiment. As illustrated in FIG. 12, the scene corresponding to the server message 88a in the image data is displayed in the image display region 42a of the display unit 42. The image display region 42a is provided with a deletion operation part 91, a range changing operation part 92, and an evaluation point changing operation part 93.

The deletion operation part 91 requests the server 330 to delete the tag information, for example, by user's touch. The range changing operation part 92 requests the server 330 to change the tag range, for example, by the user moving the part laterally. The evaluation point changing operation part 93 requests the server 330 to change the evaluation point, for example, by the user increasing and decreasing the gauge laterally.

When a request to change the setting of the tag information is issued, the tag information editor 38 may edit the tag information on the basis of the request, in the case where the chat terminal device 40 that has transmitted the request has authority for the request. In this case, examples of the chat terminal device 40 having the authority include a chat terminal device 40 possessed by the owner of the camera 10 that has shot the game, and a chat terminal device 40 possessed by the manager of the team or the system administrator.

FIG. 13 is a diagram schematically illustrating an example of the tag information. FIG. 13 illustrates the case of acquiring image data H shot by the camera 10, as an example. As illustrated in FIG. 13, in the image data H, tag ranges HT1 and HT2 are set. The respective finish times of the tag ranges HT1 and HT2 are input times t11 and t12 at each of which score time was input. The tag ranges HT1 and HT2 are set with the start times being the times t13 and t14, respectively. The times t13 and t14 are acquired by tracing back by a predetermined time from the finish times t11 and t12, respectively. For the tag ranges, for example, by making a request to delete the tag range HT1, the tag range HT1 is deleted and nullified. In addition, by making a request to change the start time of the tag range HT2 to t15 acquired by tracing back from t14, the start time of the tag range HT2 is changed to t15.

In the present embodiment, the storage unit 39 stores a chat data processing program therein. The chat data processing program causes the server 30 to execute processing of acquiring a plurality of pieces of image data acquired by shooting the game with the cameras 10, processing of acquiring score data of the game, processing of generating chat data of contents corresponding to score data when score data is acquired, processing of setting tag ranges each serving as a range of time corresponding to the input time at which the score data was input and the evaluation points for the respective tag ranges, for each of the acquired pieces of image data, as tag information, processing of storing the chat data and the pieces of image data for each of which tag information has been set, processing of transmitting the chat data stored in the storage unit to the chat terminal device, and processing of editing the tag information on the basis of a request when a request to change the setting of the tag information is issued for the chat data generated with the chat data processor.

Figure 14:
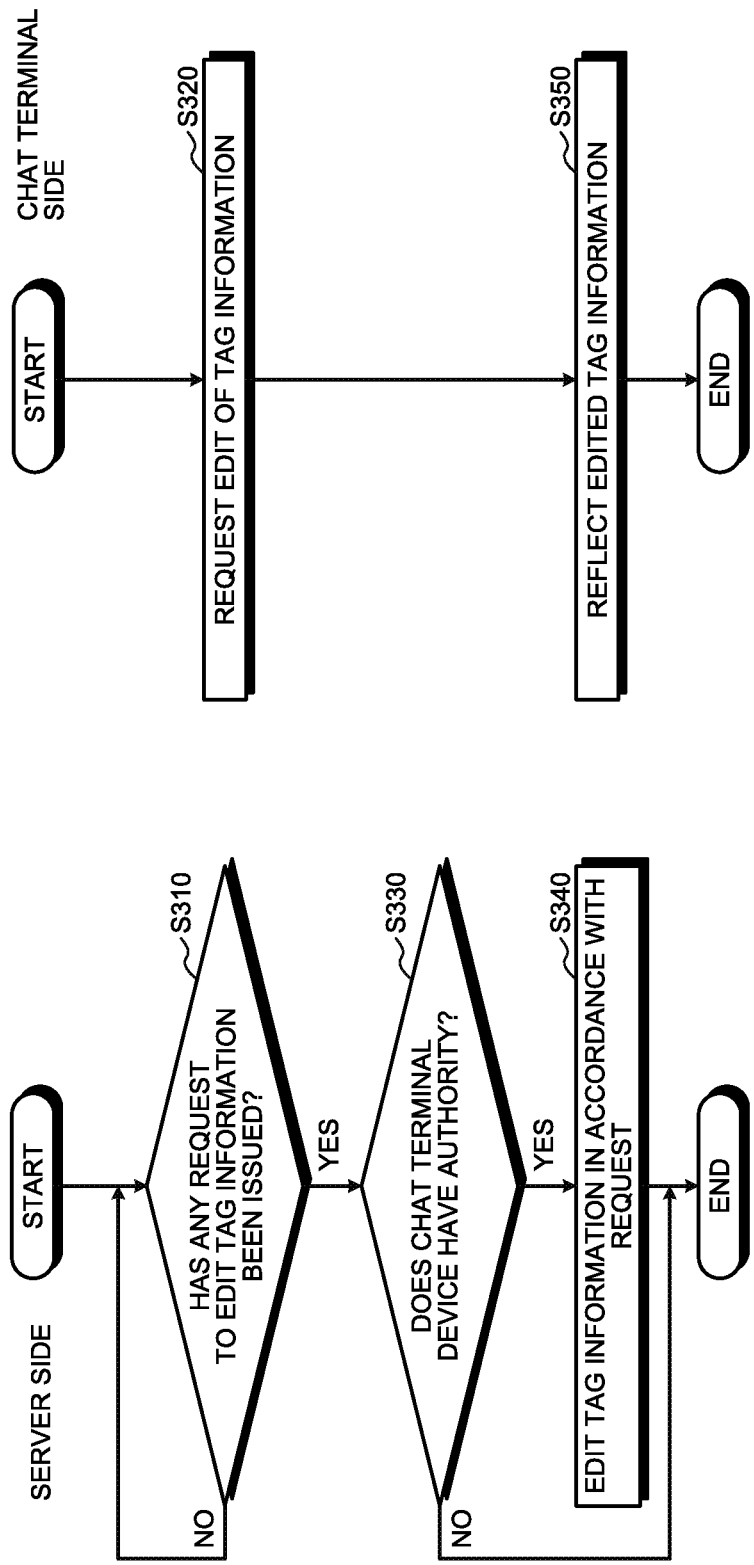
FIG. 14 includes a set of flowcharts illustrating an example of a chat display method according to the fourth embodiment.

The following is an explanation of operations of the chat system 400 structured as described above. FIG. 14 includes a set of flowcharts illustrating an example of the chat display method according to the fourth embodiment. FIG. 14 illustrates flowcharts separately for the server 30 side and the chat terminal device 40 side.

As illustrated in FIG. 14, in the server 30, the tag information editor 38 determines whether any request to edit the tag information has been issued from the chat terminal device 40 (Step S310). When it is determined that no request to edit the tag information has been issued (No at Step S310), the tag information editor 38 executes the processing of Step S310 repeatedly.

In the chat terminal device 40, the user can request the server 30 to edit the tag information, by performing the predetermined operation described above (Step S320).

On the server 30 side, when it is determined that any request to edit the tag information has been issued (Yes at Step S310), the tag editor 38 determines whether the chat terminal device 40 that has transmitted the request has authority (Step S330). When it is determined that the chat terminal device 40 has authority (Yes at Step S330), the tag information editor 38 edits the tag information in accordance with the request (Step S340). When it is determined that the chat terminal device 40 has no authority (No at Step S340), the tag information editor 38 ends the processing without performing editing. In this case, a message such as "No authority" may be transmitted to the chat terminal device 40.

In the chat terminal device 40, the display controller 56 displays the contents reflecting the edited tag information on the display unit 42 (Step S350).

The chat system 300 according to the present embodiment includes the server 30 and the chat terminal device 40; the server 30 includes the image data acquisition unit 31 acquiring a plurality of pieces of image data acquired by shooting a game with a plurality of cameras 10, the score data acquisition unit 32 acquiring score data of the game, the chat data processor 33 generating chat data of contents corresponding to the score data when score data is acquired, the tag information setting unit 34 setting at least tag ranges each serving as a range of time corresponding to input time at which score data has been input, for each of the acquired pieces of image data, as tag information, the storage unit 39 storing therein the chat data and the pieces of image data for each of which the tag information has been set, the server side communication unit 35 capable of transmitting the chat data stored in the storage unit to the chat terminal device, and the tag information editor 38 editing the tag information on the basis of a request when a request to change the setting of the tag information is issued for the chat data generated with the chat data processor; and the chat terminal device 40 includes the communication unit 43 acquiring the chat data from the server 30, and the controller displaying the acquired chat data on the display unit 42 and transmitting a request to the server 30 when an operation to request change of the setting of the tag information for the chat data generated with the chat data processor and displayed on the display unit 42 is input with the input unit 41.

The present embodiment enables deletion of unnecessary tag information and generation of more effective tag information, and enables supply of the image more suitable for the user's request.

In the chat system 300 according to the present embodiment, the tag information setting unit 34 further sets an evaluation point for each of the tag ranges as the tag information, and editing of the tag information includes at least one of deletion of the tag information, change of the tag range, and change of the evaluation point. This structure enables supply of the image more suitable for the user's request, including change of the evaluation point.

In the chat system 300 according to the present embodiment, the tag information editor 38 edits the tag information when the chat terminal device 40 that has transmitted the request to edit the tag information has authority. This structure enables prevention of unlimited change of the tag information.

Fifth Embodiment

The following is an explanation of a fifth embodiment. The whole configuration of a chat system 400 according to the present embodiment is the same as that of the fourth embodiment. The present embodiment is different from the fourth embodiment in that the tag information setting unit 34 sets tag information for each of the chat terminal devices 40, and the tag information editor 38 edits the tag information for each of the chat terminal devices 40. The other constituent elements are the same as those in the fourth embodiment.

The tag information setting unit 34 is capable of setting tag information for each of the chat terminal devices 40.

FIG. 15 is a diagram schematically illustrating an example of the tag information. FIG. 15 illustrates the case of acquiring image data I shot with the camera 10, as an example. As illustrated in FIG. 15, for the chat terminal device 40, tag ranges JT1 and JT2 are set for the image data I. The respective finish times of the tag ranges JT1 and JT2 are input times t16 and t17 at each of which score time was input. The tag ranges JT1 and JT2 are set with the start times being the times t18 and t19, respectively. The times t18 and t19 are acquired by tracing back by a predetermined time from the finish times t16 and t17, respectively. In the example illustrated in FIG. 15, in the initial state, the time t16 and time t21 have the same value, the time t17 and time t22 have the same value, the time t18 and time t23 have the same value, and the time t19 and time t24 have the same value.

By contrast, for the chat terminal device 40A, tag ranges KT1 and KT2 are set. The respective finish times of the tag ranges KT1 and KT2 are input times t21 and t22 at each of which score time was input. The tag ranges KT1 and KT2 are set with the start times being the times t23 and t24, respectively. The times t23 and t24 are acquired by tracing back by a predetermined time from the finish times t21 and t22, respectively.

When a request to change the setting of the tag information is issued for a server message serving as the chat data generated with the chat data processor 33, the tag information editor 38 edits the tag information on the basis of the request. Examples of the edit details of the tag information include deletion of the tag information, change of the tag range, and change of the evaluation point, in the same manner as the fourth embodiment. The request to change the tag information can be issued in the chat terminal device 40, in the same manner as the fourth embodiment.

When the chat terminal device 40 issues a request to change the tag information in the server 30 and the chat terminal device 40A issues no request, for example, by making a request to delete the tag range JT1, the tag range JT1 is deleted and nullified as illustrated in FIG. 15. In addition, by making a request to change the start time of the tag range JT2 to time t20 acquired by tracing back from time t19, the start time of the tag range JT2 is changed to time t20. By contrast, because the chat terminal device 40A has issued no request, the tag information is not changed for the chat terminal device 40A.

In the present embodiment, the storage unit 39 stores a chat data processing program therein. The chat data processing program causes the server to execute processing of acquiring a plurality of pieces of image data acquired by shooting the game with the cameras 10, processing of acquiring score data of the game, processing of generating chat data of contents corresponding to score data when score data is acquired, processing of setting at least tag ranges each serving as a range of time corresponding to the input time at which the score data was input, for each of the acquired pieces of image data, as tag information, and in forms different between the chat terminal devices 40, processing of storing the chat data and the pieces of image data for each of which tag information has been set, processing of transmitting the stored chat data to the chat terminal device, and processing of editing the tag information corresponding to the chat terminal device on the basis of a request when a request to change the setting of the tag information is issued from the chat terminal device for the chat data generated in accordance with the score data.

Figure 16:
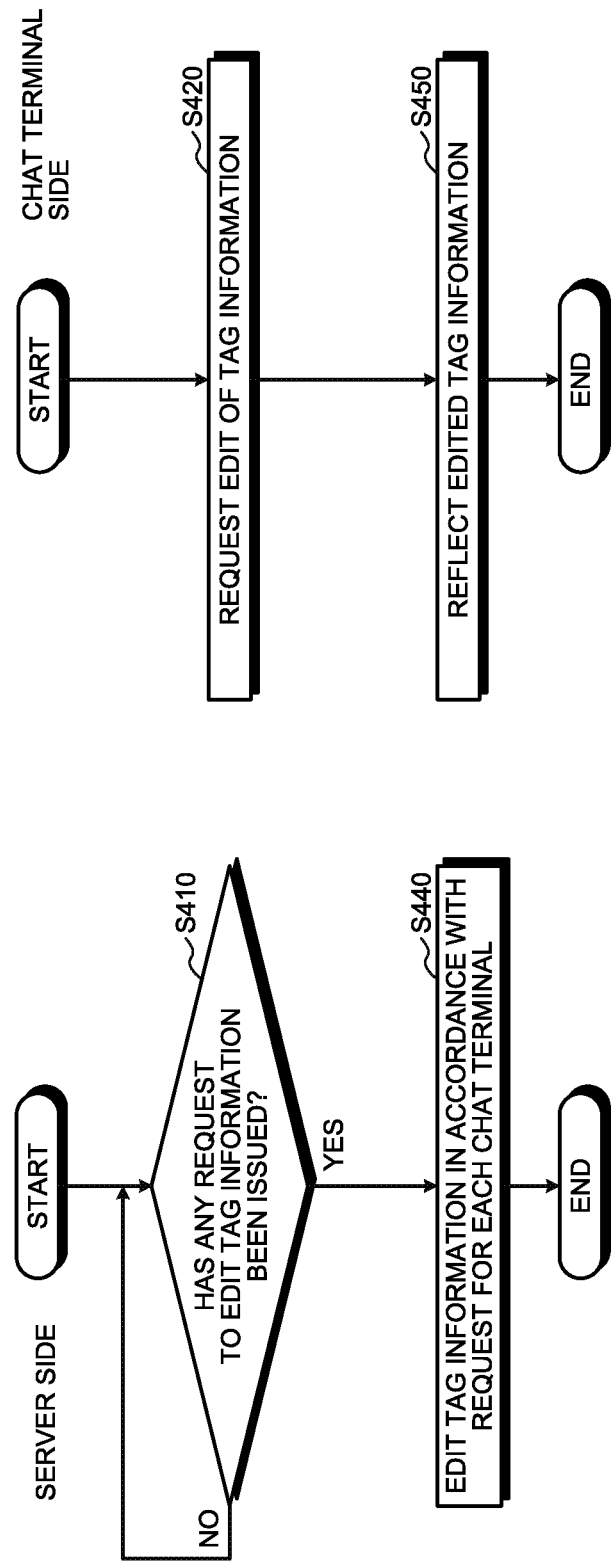
FIG. 16 includes a set of flowcharts illustrating an example of a chat display method according to a fifth embodiment.

The following is an explanation of operations of the chat system 400 structured as described above. FIG. 16 includes a set of flowcharts illustrating an example of the chat display method according to the fifth embodiment. FIG. 16 illustrates flowcharts separately for the server 30 side and the chat terminal device 40 side.

As illustrated in FIG. 16, in the server 30, the tag information editor 38 determines whether any request to edit the tag information has been issued from the chat terminal device 40 (Step S410). When it is determined that no request to edit the tag information has been issued (No at Step S410), the processing at Step S410 is performed repeatedly.

In the chat terminal device 40, by the user performing the predetermined operation described above, editing of the tag information can be requested to the server 30 (Step s420).

On the server 30 side, when it is determined that any request to edit the tag information has been issued (Yes at Step S410), the tag information editor 38 edits the tag information in accordance with the request (Step S440). In the chat terminal device 40, the display controller 56 displays the contents reflecting the edited tag information on the display unit 42 (Step S450).

The chat system 400 according to the present embodiment includes the server 30 and the chat terminal device 40; the server 30 includes the image data acquisition unit 31 acquiring a plurality of pieces of image data acquired by shooting a game with a plurality of cameras 10, the score data acquisition unit 32 acquiring score data of the game, the chat data processor 33 generating chat data of contents corresponding to the score data when score data is acquired, the tag information setting unit 34 setting at least tag ranges each serving as a range of time corresponding to input time at which score data has been input, for each of the acquired pieces of image data, as tag information, in forms different between the chat terminal devices, the storage unit 39 storing therein the chat data and the pieces of image data for each of which the tag information has been set, the server side communication unit 35 capable of transmitting the chat data stored in the storage unit to the chat terminal device, and the tag information editor 38 editing the tag information corresponding to the chat terminal device on the basis of a request when a request to change the setting of the tag information is issued from the chat terminal device for the chat data generated with the chat data processor; and the chat terminal device 40 includes the communication unit 43 acquiring the chat data from the server 30, and the controller displaying the acquired chat data on the display unit 42 and transmitting a request to the server 30 when an operation to request change of the setting of the tag information for the chat data generated with the chat data processor and displayed on the display unit 42 is input with the input unit 41.

The present embodiment enables the user to edit the tag information individually, and enables supply of the image more suitable for the user's request.

In the chat system 400 according to the present embodiment, the tag information setting unit 34 further sets evaluation points for the respective tag ranges as the tag information, in forms different between the chat terminal devices 40, and editing of the tag information includes at least one of deletion of the tag information, change of the tag range, and change of the evaluation point. This structure enables supply of the image more suitable for the user's request, including change of the evaluation point.

The present disclosure enables supply of images more suitable for the user's request.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A chat server comprising:
an image data acquisition unit that acquires a plurality of pieces of image data acquired by shooting a game with a plurality of shooting devices;
a game state data acquisition unit that acquires game state data of the game;
a chat data processor that generates chat data of contents corresponding to the game state data when the game state data is acquired;
a tag information setting unit that sets tag ranges each serving as a range of time corresponding to input time at which the game state data is input and evaluation points for the respective tag ranges, for each of the acquired pieces of image data, as tag information;
a storage unit storing therein the chat data and the acquired pieces of image data for each of which the tag information is set;
a server side communication unit that is capable of transmitting the chat data and the acquired pieces of image data stored in the storage unit to a chat terminal device; and
an image data selection unit that selects, when one piece of the chat data generated with the chat data processor is designated in the chat terminal device, one of the acquired pieces of image data from the acquired pieces of image data stored in the storage unit in response to the evaluation points set for the tag ranges corresponding to the designated chat data, and transmits the selected image data from the server side communication unit to the chat terminal device.

2. The chat server according to claim 1, wherein the tag information setting unit sets the evaluation points in response to user related information concerning a user of the chat terminal device.

3. The chat server according to claim 2, wherein the tag information setting unit sets the evaluation points in accordance with a position of the chat terminal device and positions of the shooting devices.

4. The chat server according to claim 1, wherein
the chat data processor sets a display form of each piece of the chat data in the chat terminal device in accordance with the evaluation points, and
the storage unit stores therein the chat data for each of which the display form is set and the acquired pieces of image data for each of which the evaluation points are set.

5. The chat server according to claim 4, wherein
each of the pieces of chat data includes text data for a text describing contents corresponding to the game state data and balloon data for a balloon displayed to enclose the text data, and
the chat data processor sets the display form such that at least one form of a color, a shape, and a size of the text and the balloon is different from that of the other pieces of chat data.

6. The chat server according to claim 1, further comprising:
a digest generator that selects the tag ranges set for the pieces of image data in response to the evaluation points, and connects the selected tag ranges with each other in time-series order to generate one piece of digest data,
the storage unit stores the digest data therein, and
the server side communication unit is capable of transmitting the digest data stored in the storage unit to the chat terminal device.

7. The chat server according to claim 6, wherein the tag information setting unit sets the evaluation points in response to contents of score data and positions of the shooting devices.

8. The chat server according to claim 6, wherein the digest generator selects the tag information having the evaluation points equal to or larger than a predetermined point.

9. The chat server according to claim 1, further comprising:

a tag information editor that edits, when a request to change setting of the tag information for the chat data generated with the chat data processor is issued, the tag information in response to the request.

10. The chat server according to claim 9, wherein
the tag information setting unit further sets the evaluation points for the respective tag ranges as the tag information, and
editing of the tag information includes at least one of deletion of the tag information, change of the tag ranges, and change of the evaluation points.

11. The chat server according to claim 9, wherein the tag information editor edits the tag information when the chat terminal device that has transmitted the request to edit the tag information has authority.

12. The chat server according to claim 1, wherein the tag information setting unit sets the tag ranges in forms different between a plurality of the chat terminal devices, the plurality of chat terminal devices comprise the chat terminal device and another chat terminal device different from the chat terminal device, and
the chat server further comprising a tag information editor that edits, when a request to change setting of the tag information is issued from one of the chat terminal devices for the chat data generated with the chat data processor, the tag information corresponding to the chat terminal device in response to the request.

13. The chat server according to claim 12, wherein
the tag information setting unit further sets the evaluation points for the respective tag ranges as the tag information in forms different between a plurality of the chat terminal devices, and
editing of the tag information includes at least one of deletion of the tag information, change of the tag ranges, and change of the evaluation points.

14. A chat system comprising:
a server; and
a chat terminal,
the server including:
an image data acquisition unit that acquires a plurality of pieces of image data acquired by shooting a game with a plurality of shooting devices;
a game state data acquisition unit that acquires game state data of the game;
a chat data processor that generates chat data of contents corresponding to the game state data when the game state data is acquired;
a tag information setting unit that sets tag ranges each serving as a range of time corresponding to input time at which the game state data is input and evaluation points for the respective tag ranges, for each of the acquired pieces of image data, as tag information;
a storage unit storing therein the chat data and the acquired pieces of image data for each of which the tag information is set;
a server side communication unit that is capable of transmitting the chat data and the acquired image data stored in the storage unit to a chat terminal device; and
an image data selection unit that selects, when one piece of the chat data generated with the chat data processor is designated in the chat terminal device, one of the acquired pieces of image data from the acquired pieces of image data stored in the storage unit in response to the evaluation points set for the tag ranges corresponding to the designated chat data, and transmits the selected image data from the server side communication unit to the chat terminal device,
the chat terminal including:
a communication unit that acquires the chat data and the plurality of pieces of image data from the server; and
a controller that displays the acquired pieces of image data and the acquired chat data in different regions in a display unit and, when one piece of the chat data generated with the chat data processor and displayed on the display unit is designated with an input unit, transmits a message indicating that the chat data is designated to the server, receives the acquired pieces of image data selected with the image data selection unit from the server, and displays the selected image data on the display unit.

15. A non-transitory computer readable storage medium storing therein an image data processing program causing a server to execute:
processing of acquiring a plurality of pieces of image data acquired by shooting a game with a plurality of shooting devices;
processing of acquiring game state data of the game;
processing of generating chat data of contents corresponding to the game state data when the game state data is acquired;
processing of setting tag ranges each serving as a range of time corresponding to input time at which the game state data is input and evaluation points for the respective tag ranges, for each of the acquired pieces of image data, as tag information;
processing of storing the chat data and the acquired pieces of image data for each of which the tag information is set;
processing of transmitting the chat data and the acquired pieces of image data to a chat terminal device; and
processing of selecting, when one piece of the chat data generated in accordance with the game state data is designated in the chat terminal device, one of the acquired pieces of image data from the stored pieces of image data in response to the evaluation points set for the tag ranges corresponding to the designated chat data, and transmitting the selected image data from a server side communication unit to the chat terminal device.

* * * * *